US008274921B2

(12) United States Patent
Moffatt et al.

(10) Patent No.: US 8,274,921 B2
(45) Date of Patent: *Sep. 25, 2012

(54) SYSTEM AND METHOD FOR COMMUNICATING DATA USING EFFICIENT FAST FOURIER TRANSFORM (FFT) FOR ORTHOGONAL FREQUENCY DIVISION MULTIPLEXING (OFDM)

(75) Inventors: Christopher D. Moffatt, Palm Bay, FL (US); Anders Mattsson, San Diego, CA (US); John W. Pajunen, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 1205 days.

This patent is subject to a terminal disclaimer.

(21) Appl. No.: 12/060,292

(22) Filed: Apr. 1, 2008

(65) Prior Publication Data

US 2009/0245084 A1    Oct. 1, 2009

(51) Int. Cl.
  *H04K 1/10*    (2006.01)
(52) U.S. Cl. ........ 370/260; 375/132; 375/219; 375/260; 375/261; 375/267; 375/295; 375/296; 375/297
(58) Field of Classification Search ........... 375/260, 375/261, 267, 132, 219, 295, 296, 297; 370/203, 370/204, 205, 208, 209, 210, 328, 335, 344; 708/404
See application file for complete search history.

(56) References Cited

U.S. PATENT DOCUMENTS

| 3,778,604 | A | 12/1973 | Bosc et al. | 235/152 |
|---|---|---|---|---|
| 6,473,467 | B1 | 10/2002 | Wallace et al. | 375/267 |
| 6,556,557 | B1 | 4/2003 | Cimini, Jr. et al. | 370/342 |
| 6,724,834 | B2 | 4/2004 | Garrett et al. | 375/317 |
| 6,928,084 | B2 | 8/2005 | Cimini, Jr. et al. | 370/430 |
| 7,039,001 | B2 | 5/2006 | Krishnan et al. | 370/203 |
| 7,577,698 | B2 * | 8/2009 | Teng et al. | 708/404 |
| 7,809,078 | B2 * | 10/2010 | Hori et al. | 375/295 |
| 7,929,621 | B2 * | 4/2011 | Kim et al. | 375/260 |
| 2003/0026346 | A1 | 2/2003 | Matsumoto et al. | 375/262 |
| 2003/0081538 | A1 | 5/2003 | Walton et al. | 370/206 |
| 2004/0005016 | A1 | 1/2004 | Tewfik et al. | 375/302 |
| 2004/0218523 | A1 | 11/2004 | Varshney et al. | 370/208 |
| 2005/0025042 | A1 | 2/2005 | Hadad | 370/208 |
| 2005/0031016 | A1 | 2/2005 | Rosen | 375/130 |
| 2005/0041746 | A1 | 2/2005 | Rosen et al. | 375/242 |
| 2005/0089116 | A1 | 4/2005 | Moffatt et al. | 375/295 |
| 2005/0102342 | A1 * | 5/2005 | Greene | 708/409 |

(Continued)

OTHER PUBLICATIONS

Moffatt et al., "Computationally Efficient IFFT/FFT Approximations for OFDM", Military Communications Conference, MILCOM 2007, IEEE, Oct. 29, 2007, pp. 1-7.

*Primary Examiner* — Dhaval Patel
(74) *Attorney, Agent, or Firm* — Allen, Dyer, Doppelt, Milbrath & Gilchrist, P.A.

(57) ABSTRACT

A system communicates data and includes a transmitter for transmitting a communications signal that carries communications data. It includes an efficient modulator for approximating the frequencies of sine/cosine basis waveforms using complex exponential functions and adding and subtracting the complex exponential functions to generate an Orthogonal Frequency Division Multiplexed (OFDM) communications signal as a plurality of N data subcarriers that carry communications data as data symbols. A receiver receives the OFDM communications signal and includes a demodulation circuit for demodulating the OFDM communications signal using logical shifts of multiples $+/-2^P$ based on complex exponential functions corresponding to sine/cosine basis waveform approximations to extract amplitude and phase values from a plurality of N data subcarriers as data symbols within the OFDM communications signal.

24 Claims, 21 Drawing Sheets

U.S. PATENT DOCUMENTS

| | | | |
|---|---|---|---|
| 2005/0128936 A1 | 6/2005 | Shao | 370/208 |
| 2005/0159115 A1 | 7/2005 | Sandhu | 455/101 |
| 2005/0197076 A1 | 9/2005 | Saito et al. | 455/108 |
| 2005/0220174 A1 | 10/2005 | Mills et al. | 375/132 |
| 2005/0259758 A1* | 11/2005 | Razzell | 375/260 |
| 2006/0029012 A1 | 2/2006 | Mottier et al. | 370/320 |
| 2006/0039272 A1 | 2/2006 | Sikri et al. | 370/208 |
| 2006/0050626 A1 | 3/2006 | Yucek et al. | 370/208 |
| 2006/0109919 A1 | 5/2006 | Nieto | 375/260 |
| 2006/0129621 A1 | 6/2006 | Kim et al. | 708/404 |
| 2006/0146693 A1 | 7/2006 | Mori et al. | 370/208 |
| 2011/0007715 A1* | 1/2011 | Kwon et al. | 370/335 |
| 2011/0040350 A1* | 2/2011 | Griffith | 607/57 |

* cited by examiner

SYSTEM AND METHOD FOR COMMUNICATING DATA USING EFFICIENT FAST FOURIER TRANSFORM (FFT) FOR ORTHOGONAL FREQUENCY DIVISION MULTIPLEXING (OFDM)

FIELD OF THE INVENTION

The present invention relates to communications systems, and more particularly, this invention relates to multiple carrier communications systems, including but not limited to, Orthogonal Frequency Division Multiplexing (OFDM) communications systems.

BACKGROUND OF THE INVENTION

In OFDM communications systems the frequencies and modulation of a frequency-division multiplexing (FDM) communications signal are arranged orthogonal with each other to eliminate interference between signals on each frequency. In this communications system, low-rate modulations with relatively long symbols compared to the channel time characteristics are less sensitive to multipath propagation issues. OFDM transmits a number of low symbol-rate data streams on separate narrow frequency subbands using multiple frequencies simultaneously, instead of transmitting a single, high symbol-rate stream on one wide frequency band on a single frequency. These multiple subbands have the advantage that the channel propagation effects are generally more constant over a given subband than over the entire channel as a whole. A classical In-phase/Quadrature (I/Q) modulation can be transmitted over individual subbands. Also, OFDM is typically used in conjunction with a Forward Error Correction scheme, which in this instance is sometimes termed Coded Orthogonal FDM or COFDM.

As known to those skilled in the art, an OFDM signal can be considered the sum of a number of orthogonal subcarrier signals, with baseband data on each individual subcarrier independently modulated, for example, by Quadrature Amplitude Modulation (QAM) or Phase-Shift Keying (PSK). This baseband signal can also modulate a main RF carrier.

OFDM signals are generally created by performing the inverse Fourier transform on the data, with the Inverse Fast Fourier Transform (IFFT) becoming the preferred method since it is numerically efficient. Additionally, OFDM demodulation requires use of the Fourier Transform. This is typically implemented with a Fast Fourier Transform (FFT) requiring complex multiplications in an OFDM receiver that decodes a packet of k-symbols requiring complex multiplications.

An algorithm's efficiency, such as the FFT or IFFT, is typically measured by the number of required multiplications and additions. The hardware implementation complexity is usually determined by the number of multiplications-per-second, since multipliers typically take up more real estate and clock-cycles on processors and VLSI designs. Direct evaluation of the N-point discrete Fourier Transform (DFT) requires $N^2$ complex multiplications and $N*(N-1)$ complex additions, or $4*N^2$ real multiplications and $N*(4*N-2)$ real additions. The DFT of a finite-length sequence of length N is:

$$X[k] = \sum_{n=0}^{N-1} x[n] \cdot W_N^{kn}, k = 0, 1, \ldots, N-1$$

-continued $$x[n] = \frac{1}{N} \sum_{n=0}^{N-1} X[k] \cdot W_N^{kn}, n = 0, 1, \ldots, N-1$$

where W is the twiddle factor matrix with the elements defined by the complex exponential $W_N^{n \cdot k} = e^{j \cdot 2 \cdot \pi \cdot n \cdot k/N}$ for $k=0, 1, \ldots, N-1$ and $n=0, 1, \ldots, N-1$.

As known to those skilled in the art, the fast Fourier Transform (FFT) is a set of algorithms that substantially reduce the number of computations required to compute the DFT. The radix-R FFT algorithms operate by splitting the N-point DFT into v stages, where v is an integer and $N=R^v$. The well-known radix-2 algorithm ($N=2^v$) is based on decomposing the sequence x[n] into successively smaller sub-sequences for processing by smaller DFT's and is referred to as a decimation-in-time algorithm. Accordingly, the radix-2 algorithm that decomposes the Fourier coefficients into smaller sub-sequences is called a decimation-in-frequency algorithm. These algorithms exploit both the periodicity and symmetry of the twiddle factor matrix. The radix-2 algorithm requires $$\frac{N}{2} \cdot \log_2(N)$$

complex multiplications and $N \cdot \log_2(N)$ complex additions. In other words, the computation workload is reduced by $$\frac{N}{\log_2(N)}$$

when compared to a direct evaluation of the DFT. If v=10, then N=1024 and the number of complex multiplications is 5120, which is more than 200 times more efficient than the DFT requiring 1048576 complex multiplications. A radix-4 algorithm [4] requires $$\frac{3}{8} \cdot N \cdot (\log_2(N) - 2)$$

complex multiplications and $N \cdot \log_2(N)$ additions.

Since these calculations are performed on data blocks of length N, the number of multiplications per sample is $\log_2(N)$ for the IFFT. A 1024-point IFFT will require 5120 multipliers, or 5 multiplications per input sample. The OFDM symbol can be seen as a sum of carriers $f_n(k)$ according to $$y_k = \sum_{n=-N/2+1}^{N/2} x_n e^{ink2\pi/N} = \sum_{n=-N/2+1}^{N/2} x_n f_n(k)$$

and rewritten into the more common form $$y_k = \sum_{n=0}^{N-1} x_n e^{ink2\pi/N}$$

The number of multiplications using the FFT or IFFT greatly impact hardware complexity and increases gate count. Also, there is significant implementation loss due to fixed-point rounding error.

Additionally, the problems associated with the Peak to Average Power Ratio (PAPR) using OFDM is further motivation to generate techniques for simplifying the FFT and IFFT techniques used in generating OFDM communications signals. Commonly assigned U.S. Patent Publication No. 2005/0089116, the disclosure which is hereby incorporated by reference in its entirety, discloses a system that reduces peak-to-average power ratio. There is still a need, however, to simplify the IFFT and FFT.

SUMMARY OF THE INVENTION

A system communicates data and includes a transmitter for transmitting a communications signal that carries communications data. It includes an efficient modulator for approximating the frequencies of sine/cosine basis waveforms using complex exponential functions and adding and subtracting the complex exponential functions to generate an Orthogonal Frequency Division Multiplexed (OFDM) communications signal as a plurality of N data subcarriers that carry communications data as data symbols. A receiver receives the OFDM communications signal and includes a demodulation circuit for demodulating the OFDM communications signal using logical shifts of multiples $+/-2^p$ based on complex exponential functions corresponding to sine/cosine basis waveform approximations to extract amplitude and phase values from a plurality of N data subcarriers as data symbols within the OFDM communications signal. In one aspect, the modulator of the transmitter includes at least one memory element for storing complex exponential functions of sine/cosine basis waveform approximations. A logic circuit adds and subtracts the complex exponential frequency functions. The logic circuit includes a shift register circuit for adding and subtracting the complex exponential functions as cosine (nkω/N) and sine (nkω/N). The logical shifts, sign changes, and additions correspond to the input digital constellation symbols. The modulator of the transmitter is operative for modulating N data subcarriers. The modulator of the transmitter is also operative for modulating data subcarriers using quadrature amplitude modulation (QAM).

In another aspect, the demodulator of the receiver includes at least one memory element for storing complex exponential functions of sine/cosine basis waveform approximations. A logic circuit can perform logical shifts and additions in multiples of $+/-2^p$. The logic circuit can be formed as a plurality of mixers that mix an incoming OFDM communications signal with sine/cosine basis approximations. Each mixer can include a summer connected thereto for summing outputs in the respective mixer.

In another aspect, a forward error correction encoder can apply a forward error correction code to the communications data as data symbols.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Before explaining in detail aspects of the system and method in accordance with a non-limiting example of the present invention, a technical explanation is set forth of the theory, followed by a practical explanation of basic components used in such system and method. Other details of such OFDM systems are found in commonly assigned and copending U.S. patent application Ser. Nos. 11/464,877; 11/464,857; 11/464,854; 11/464,861; 11/464,868, the disclosures which are hereby incorporated by reference in their entirety.

Orthogonal Frequency Division Multiplexing (OFDM) is also termed Multicarrier Modulation (MCM) because the signal uses multiple carrier signals that are transmitted at different frequencies. Some of the bits or symbols normally transmitted on one channel or carrier are now transmitted by this system on multiple carriers in the channel. Advanced Digital Signal Processing (DSP) techniques distribute the data over multiple carriers (subcarriers) at predetermined frequencies. For example, if the lowest-frequency subcarrier uses a base frequency, the other subcarriers could be integer multiples of that base frequency. The particular relationship among the subcarriers is considered the orthogonality such that the energy from one subcarrier can appear at a frequency where all other subcarrier's energy equal zero. There can be a superposition of frequencies in the same frequency range. This results in a lower symbol rate on each subcarrier with less Inter-Symbol Interference (ISI) due to adverse effects of multipath. In many OFDM communications systems, a Guard Interval (GI) or Cyclic Prefix (CP) is prefixed or appended to the OFDM symbol to mitigate the effects of ISI.

Figures 1A, 1B:
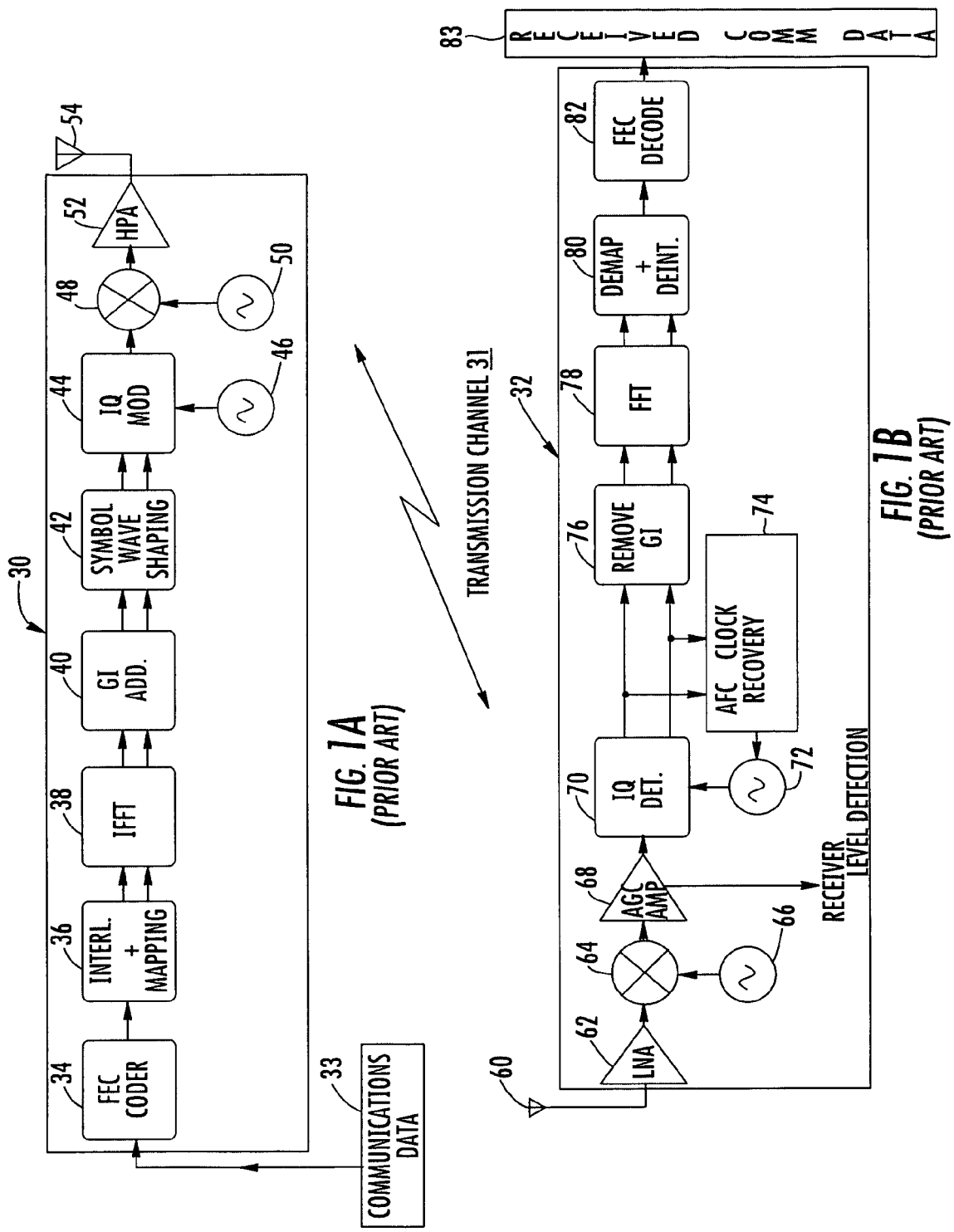
FIGS. 1A and 1B are prior art, high-level block diagrams showing respective transmitter and receiver circuits for an IEEE 802.11a OFDM modem connected through a radio transmission channel, illustrated for purposes of technical description and understanding of the present invention.
Figure 2A:
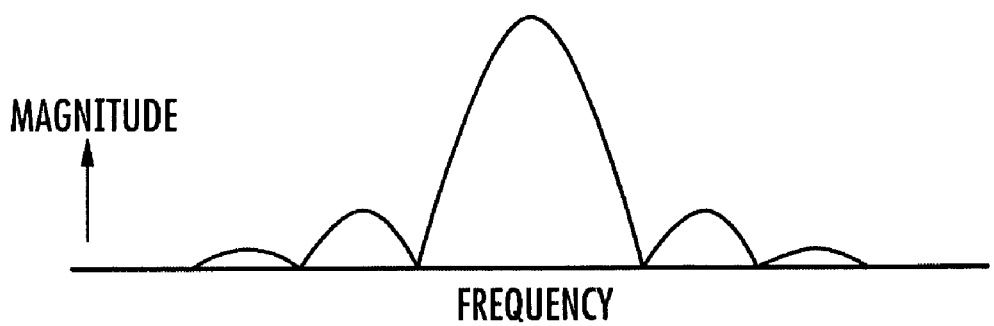
FIGS. 2A through 2C are spectrum graphs -representing a) a single carrier signal; b) a Frequency Division Multiplexing (FDM) signal; and c) an Orthogonal Frequency Division Multiplexing (OFDM) signal for purposes of technical description and understanding of the present invention.
Figure 2B:
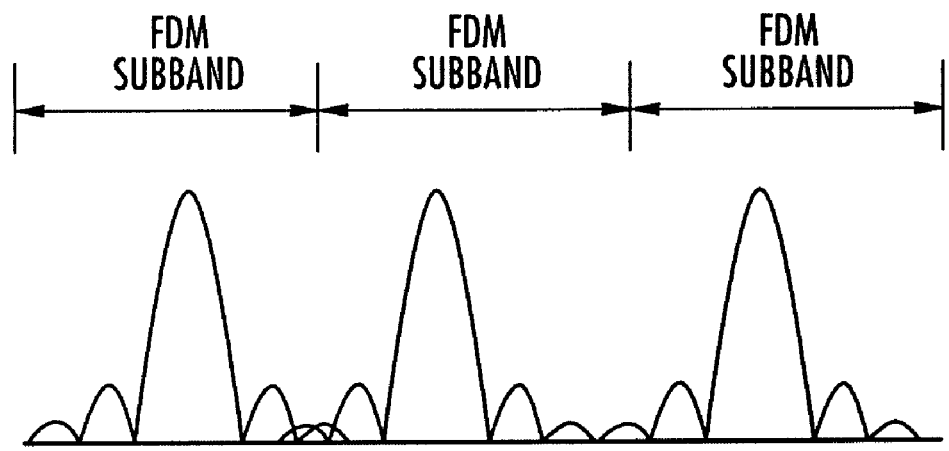
Figure 2C:
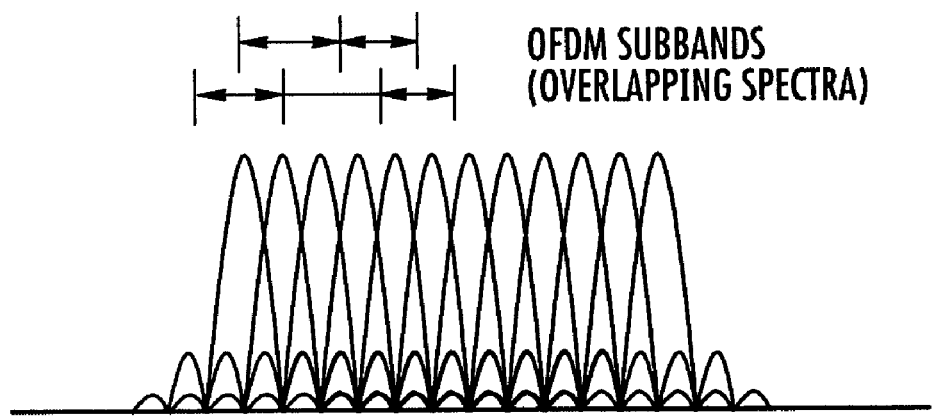
Figure 3A:
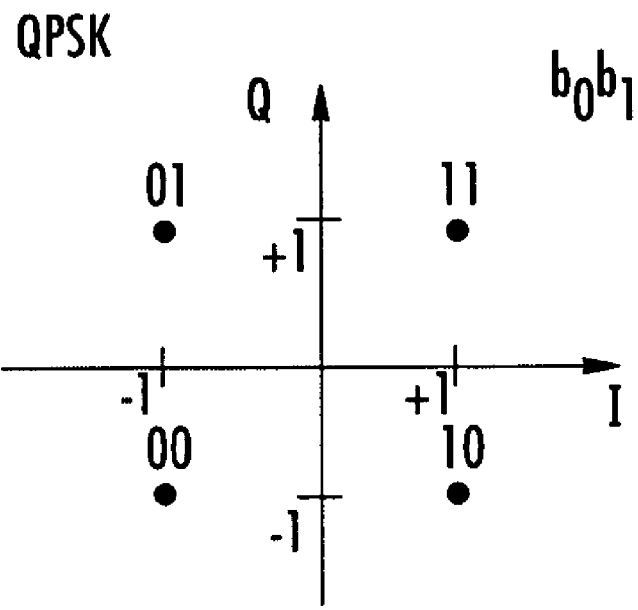
FIGS. 3A and 3B show two digital constellations that can be used for a modulation process in accordance with a non-limiting example of the present invention and showing a Quadrature Phase Shift Keying (QPSK) digital constellation in FIG. 3A and a Binary Phase Shift Keying (BPSK) digital constellation in FIG. 3B.
Figure 3B:
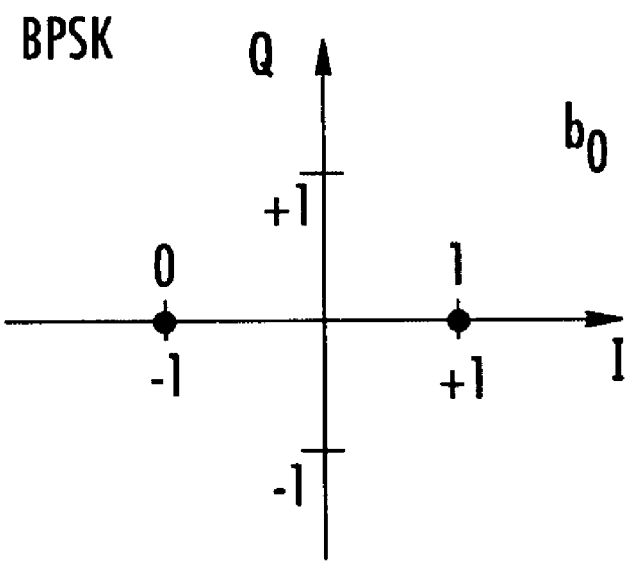
Figure 4:
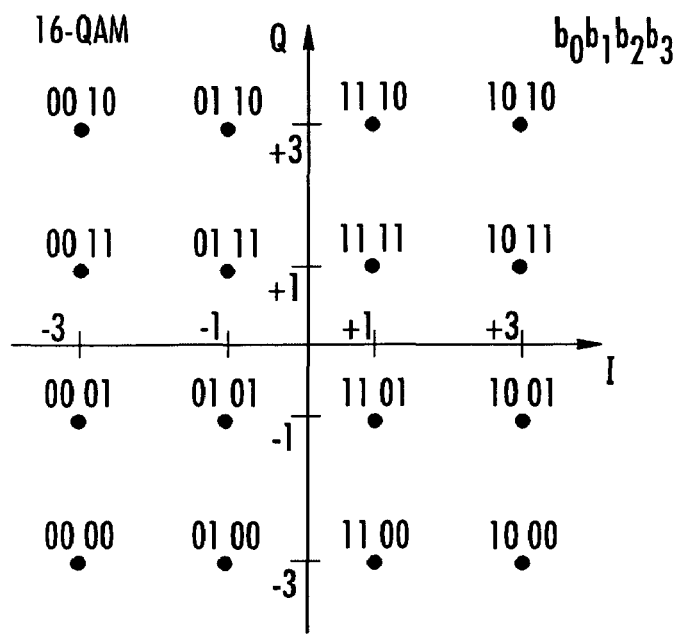
FIG. 4 is a digital constellation for a 16-QAM for use in accordance with a non-limiting example of the present invention.

FIGS. 1A and 1B are high-level block diagrams showing basic circuit components of an IEEE 802.11a OFDM modem, and showing the transmitter circuit 30 in FIG. 1A and the receiver circuit 32 in FIG. 1B for purposes of technical description and understanding. The transmitter circuit 30 (also termed "transmitter" for clarity) transmits an OFDM signal as shown in FIG. 2C. By comparison for purposes of understanding, FIG. 2A shows the spectrum of a single carrier signal and FIG. 2B shows in comparison to the single carrier signal of FIG. 2A, the spectrum of a classical Frequency Division Multiplexing (FDM) signal. FIG. 2C shows the spectrum of an OFDM signal.

The drawings in FIGS. 2A through 2C show that OFDM is based on a frequency-division multiplexing (FDM) system where each frequency channel is modulated. The frequencies and modulation of an FDM system are now orthogonal to each other to eliminate interference between channels. Because low-rate modulations with relatively long symbols compared to the channel time characteristics are less sensitive to multipath, an OFDM communications system allows a number of low-rate symbol streams to be transmitted simultaneously on multiple carriers rather than having one high-rate symbol stream transmitted on a single carrier. Thus, the frequency spectrum in an OFDM communications system is divided into multiple low-bandwidth subbands. Since each subband covers a relatively narrow section of the frequency spectrum, channel propagation effects are more constant or "flat" over a given subband compared to channel variations over the entire occupied spectrum. Any type of in-phase and quadrature (I/Q) modulation can be used to modulate any subcarrier, for example, Binary Phase Shift Keying (BPSK), Quadrature Phase Shift Keying (QPSK) or Quadrature Amplitude Modulation (QAM), or any of the numerous and different derivations of these modulation schemes. Different signal processing techniques, for example, channel coding, power allocation, adaptive modulation encoding, and similar schemes can be applied to one or more subbands. Multi-user allocation is also possible for example using time, coding, or frequency separation.

In an OFDM communications system using a transmitter and receiver such as shown in FIGS. 1A and 1B, one transmitter will transmit a signal on dozens or thousands of different orthogonal frequencies that are independent with respect to the relative amplitude and phase relationship between the frequencies. Each subcarrier signal typically will have space for only a single narrowband signal because the signals are closely spaced and it is important to prevent signals on adjacent subcarriers from interfering with each other. In an OFDM system, the symbols on each subcarrier are constructed such that energy from their frequency components are zero at the center of every other subcarrier, enabling a higher spectral efficiency for OFDM symbols than is possible in classic FDM.

The conventional OFDM system as shown in FIGS. 1A and 1B includes channel coding as a Forward Error Correction (FEC) technique, using a Forward Error Correction encoder to create a coded orthogonal FDM (COFDM) signal. Channel-State Information (CSI) techniques can also be employed, including continuous wave (CW) interferer and/or selective channel systems.

An OFDM signal is typically the sum of each of the orthogonal subcarriers. Baseband data is independently modulated onto each of the orthogonal subcarriers using some type of modulation, such as Quadrature Amplitude Modulation (QAM) or Phase Shift Keying (PSK) schemes as discussed before. Because the spectrum of each subcarrier overlaps, it can be considerably wider than if no overlap were allowed. Thus, OFDM provides high spectrum efficiency. Because each subcarrier operates at a low symbol rate, the duration of each symbol in the subcarrier is long. (For clarity, "symbol rate" is equal to the inverse of "symbol duration"). By using Forward Error Correction (FEC) equalization and modulation, there can be an enhanced resistance against a) link dispersion, b) slowly changing phase distortion and fading, c) frequency response nulls, d) constant interference, and e) burst noise. Further, the use of a Guard Interval (GI) or cyclic prefix provides enhanced resistance against multipath in the transmission channel.

Typically, in an OFDM communications system, a subcarrier and somewhat rectangular pulse can be employed and operative by an Inverse Discrete Fourier Transform (IDFT) using an Inverse Fast Fourier Transform (IFFT) circuit within the transmitter. At a receiver, a Fast Fourier Transform (FFT) circuit reverses this operation. The rectangular pulse shape results in a Sin(x)/x spectrum in the subcarriers.

The spacing of subcarriers can be chosen such that the received subcarriers can cause zero or acceptably low Inter-Carrier Interference (ICI) when the receiver and transmitter are synchronized. Typically, OFDM communications systems split the available bandwidth into many narrow-band subbands from as little as a few dozen to as many as eight thousand to ten thousand. Unlike the communications system providing multiple channels using classical FDM as in FIG. 2b, the subcarriers for each subband in OFDM are orthogonal to each other and have close spacing and little overhead. In an OFDM communications system, there is also little overhead associated with any switching that may occur between users as in a Time Division Multiplexing Access (TDMA) communications system. Usually, the orthogonality of subcarriers in an OFDM communications system allows each carrier to have an integer number of cycles over a symbol period. As a result, the spectrum of a subcarrier has a null at the center frequency of its adjacent subcarriers.

Usually, in an OFDM communications system, the spectrum required for transmitting data is chosen based on the input data and a desired modulation scheme to be used with each carrier that is assigned the data to transmit. Any amplitude and phase of the carrier is calculated based on the modulation, for example, BPSK, QPSK or QAM as noted before. Any required spectrum is converted using the IFFT circuit to ensure carrier signals are orthogonal.

It should be understood that a FFT circuit transforms a cyclic time domain signal to an equivalent frequency spectrum by finding an equivalent waveform that is generated as a sum of orthogonal sinusoidal components. The frequency spectrum of the time domain signal is usually represented by the amplitude and phase sinusoidal components. The IFFT circuit performs the reverse process and transforms the spectrum of the amplitude and phase into a time domain signal. For example, an IFFT circuit can convert a set of complex data points into a time domain signal of the same number of points. Each complex input point will result in an integral number of sinusoid and cosinusoid cycles represented by the same number of points as were input to the IFFT. Each sinusoid known as the in-phase component, and cosinusoid known as the quadrature component, will be orthogonal to all other components generated by the IFFT. Thus, orthogonal carriers can be generated by setting an amplitude and phase for each frequency point representing a desired subcarrier frequency and performing the IFFT.

It should be understood that a Guard Interval (GI), also termed a cyclic prefix, often is added to an OFDM symbol. The guard interval reduces the effects of the wireless channel on Inter-Symbol Interference (ISI) and contains redundant transmission information. Referring to the IEEE 802.11a standard as a non-limiting example, if a carrier spacing is 312.5 KHz, and the Fourier Transforms are performed over 3.2 microseconds, then a 0.8 microsecond guard interval can be applied for ISI rejection. The guard "interval" could be the last $T_g$ seconds of an active symbol period that is prefixed to an OFDM symbol, making it a cyclic prefix. It is kept short for a fraction of "T," corresponding to the total length of the active symbol, yet longer than the channel impulse response. This helps reduce the ISI and Inter-Carrier Interference (ICI) and maintains subcarrier orthogonality. In this example, a time waveform appears periodic to the receiver over the duration of the FFT.

To reduce ICI, the OFDM symbol can be cyclically extended in the guard time to ensure that delayed replicas of the OFDM symbol can have an integer number of cycles within the FFT interval, as long as the delay is smaller than the guard time. As a result, multipath signals with delays smaller than the guard time would not produce ICI.

Multipath interference is caused when multiple copies of the transmitted signal arrive at the receiver at different times. It should be understood that an OFDM communications system reduces the effect of multipath interference by providing the ability to add signal redundancy in both frequency and time by the use of various coding algorithms For example, with the IEEE 802.11a standard using OFDM, 48 subcarriers can be transmitted simultaneously. The coding gain can be provided using a one-half (½) convolutional encoder at the transmitter and later a Viterbi decoder. Data bits can be interleaved across multiple symbols and subcarriers. Lost data often is recoverable because of interleaving across the frequency and time space.

Increasing the data rate requires an increase in the symbol rate for a fixed number of carriers, fixed modulation scheme and fixed sample rate. For a single carrier system, complex equalizers and adaptive filters are required at the receiver to compensate for the magnitude and time distortions caused by the channel. The accuracy and dynamic range required of such equalizers and filters increases markedly as symbol times are decreased. However, in an OFDM system, for example, when 48 subcarriers are transmitted simultaneously, the symbol rate is effectively reduced by 48 times, significantly reducing the requirements of channel equalizers and filters. The reduced symbol rate of an OFDM system enables a robust communication link, resistant to ISI.

It should be understood that an OFDM receiver receives a sum of the different signals as subcarriers. The addition of a guard interval can further enhance performance in an OFDM system by ensuring that no symbol transitions occur during each received symbol time. For example, if an OFDM subcarrier is BPSK modulated, there would be a 180 degree phase jump at symbol boundaries. By choosing a guard interval that is longer than the largest expected time difference between the first and last multipath signals, such phase transitions can occur only during the guard time, meaning there are no phase transitions during the FFT interval. If the phase transitions of a delayed path occur within the FFT interval of the receiver, then the summation of the subcarriers of the first path with the phase modulated waves of the delayed path would no longer produce a set of orthogonal subcarriers, resulting in a certain level of interference.

For purposes of general technical understanding of the OFDM system as will be explained later, basic components of a conventional OFDM transmitter and receiver are explained. FIG. 1A illustrates a high-level block diagram of a prior art transmitter 30 for the IEEE 802.11a OFDM modem described above, and includes a Forward Error Correction (FEC) Coder circuit 34 that receives a signal representing the data to be communicated 33, and encodes the signal with a forward error correction code as described above. The signal passes to an interleaving and mapping circuit 36 in which interleaving and frequency mapping occurs. An IFFT circuit 38 receives the interleaved and frequency mapped signal and creates multiple time domain carriers summed in a single in-phase/ quadrature time domain sequence known as a symbol. A guard interval circuit 40 adds a guard interval. A symbol wave shaping circuit 42, for example a raised cosine filter, shapes the symbol waveform to limit its spectral content. Afterward, an In-phase/Quadrature (I/Q) modulator 44 processes the baseband I/Q signal, producing I/Q modulation, and also receiving a Local Oscillator (LO) signal from LO signal generator 46. Signal up-conversion to the final transmit carrier frequency occurs at mixer 48, which receives a local oscillator signal generated by LO signal generator 50. Afterward, the signal is amplified by a High Power Amplifier (HPA) 52, and the OFDM signal is transmitted through an antenna 54 on its carrier wave into the RF channel 31. Various stages of frequency filtering, for example between the I/Q Modulator 44 and mixer 48, and between the mixer 48 and HPA 52, and at the output of the HPA 52 are not shown in the block diagram.

FIG. 1B shows a high-level block diagram of the prior art receiver circuit 32 used in the exemplary IEEE 802.11a OFDM modem. The antenna 60 receives the OFDM signal from the RF Channel 31 on the carrier wave. It is amplified within a low noise amplifier (LNA) 62. Signal down-conversion occurs within a mixer 64, which also receives a local oscillator signal generated by an LO signal generator 66. An Automatic Gain Control (AGC) amplifier 68 provides automatic gain control to the down-converted signal to ensure the appropriate signal level is applied to the subsequent circuitry. The AGC circuit uses a feedback technique and is well known to those skilled in the art. In-phase and quadrature signal detection occurs within an I/Q Detect circuit 70, which also receives a local oscillator signal generated from a LO signal generator 72, which is also operative with an Automatic Frequency Control (AFC) clock recovery circuit 74, as illustrated. The AFC circuit adjusts the local oscillator 72 frequency to keep the I/Q detector tuned appropriately. The I/Q Detect circuit 70, AFC clock Recovery circuit 74, and LO signal generator 72 form a feedback loop as illustrated and known to those skilled in the art. The guard interval is removed within a GI circuit 76. The Fast Fourier Transform (FFT) is applied on the subcarriers as a reverse of the IFFT within an FFT circuit 78. Demapping and deinterleaving occur within a Demapping and Deinterleaving circuit 80. Forward error correction decoding occurs within an FEC decoder 82, which finishes the signal processing and recovers the original data as received communications data 83. It is thus evident that the function of the receiver circuit 32 as shown in FIG. 1B operates in a manner functionally the reverse of the transmitter circuit 30 shown in FIG. 1A.

As discussed above, OFDM communications systems can use FEC techniques and known interleaving and mapping techniques before IFFT processing as shown in FIG. 1A, and demapping and deinterleaving techniques followed by FEC decoding after FFT processing as shown in FIG. 1B.

These interleaving, coding, e.g., convolutional codes, including puncturing, and deinterleaving and decoding and related techniques often are integral parts of OFDM communications systems. As an example, a rate $\frac{1}{2}$, K=7 convolutional code can be used as an industry standard code for forward error correction (FEC) during encoding. For purposes of understanding, a more detailed description of these basic system components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters range typically from 1 to 8, m ranges typically from 2 to 10, and the code rate typically ranges from $\frac{1}{8}$ to $\frac{7}{8}$ in non-limiting examples. Sometimes convolutional code chips are specified by parameters (n, k, L) with L equal to the constraint length of the code. Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate $\frac{1}{2}$ code is used, the transmission of a subset of the output bits of the encoder can convert the rate $\frac{1}{2}$ code into a rate $\frac{2}{3}$ code. Thus, one hardware circuit or module can produce codes of different rates. Punctured codes can be used also, which allow rates to be changed dynamically through software or hardware depending on channel conditions, such as rain or other channel impairing conditions.

An encoder for a convolutional code typically uses a Linear Feedback Shift Register (LFSR) or look-up table (LUT) for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, such as Viterbi decoding in one non-limiting example, which typically is more desirable. Sequential decoding allows both forward and backward movement through the trellis. Viterbi decoding as maximum likelihood decoding examines a receive sequence of given length, computes a metric for each path, and makes a decision based on the metric. Turbo codes are another example of a forward error correction scheme that can be used.

Puncturing convolutional codes is a common practice in some OFDM systems and can be used in accordance with non-limiting examples of the present invention. It should be understood that in some examples a punctured convolutional code is a higher rate code obtained by the periodic elimination of specific logic bits or symbols from the output of a low rate encoder. Punctured convolutional code performance can be degraded compared with original codes, but typically the data rate increases.

Some of the basic components that could be used as non-limiting examples of the present invention include the transmitter as described before that incorporates a convolutional encoder, which encodes a sequence of binary input vectors to produce the sequence of binary output vectors and can be defined using a trellis structure, An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio modem or transceiver as described above. For example if the constraint length of the convolutional code is 7, the encoder and Viterbi decoder could support selectable code rates of $\frac{1}{2}$, $\frac{2}{3}$, $\frac{3}{4}$, $\frac{4}{5}$, $\frac{5}{6}$, $\frac{6}{7}$, $\frac{7}{8}$ using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate $\frac{1}{2}$ code.

The Viterbi decoder parameters could include the convolutional code rate as a ratio of input to output bits for the convolutional encoder. The puncture rate could be the ratio of input to output bits for the convolutional encoder using a puncturing process and can be derived from a rate $\frac{1}{2}$ mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

Also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

There now follows a more detailed description of the system and method in accordance with a non-limiting example of the present invention, which reduces the computations for the IFFT and FFT in OFDM communications systems. There are total of N subcarriers, in the typical IFFT case, where N is a power of 2. In most practical OFDM signals, $x_n$ only takes values from a discrete alphabet such as $\{1, -1\}$ for BSPK, $\{-1-i, -1+i, 1-i, 1+i\}$ for QPSK and similar modulations. If the functions $f_n(k)$ are pre-stored in a memory, and modulation schemes such as BPSK, QPSK, 64 QAM, and similar processes are used, the modulation process can be implemented without using any multipliers. The modulation process adds or subtracts complex exponential functions, (i.e. the basis functions) in accordance with a non-limiting example of the present invention.

Figure 5:
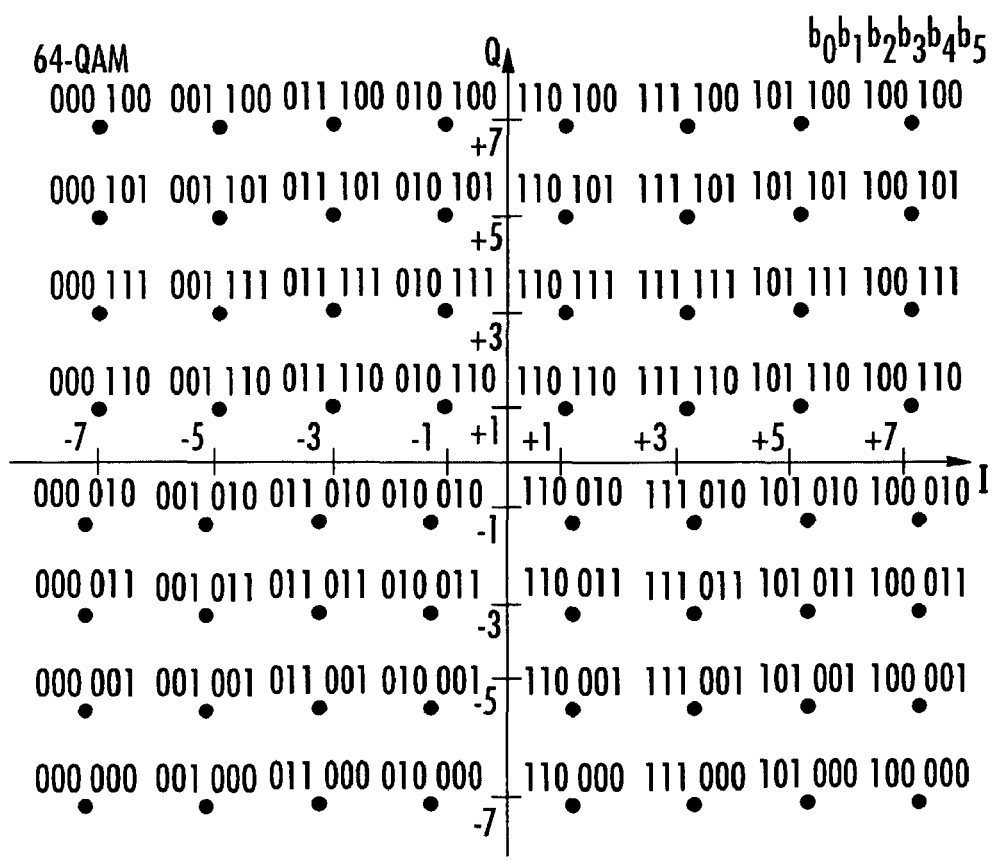
FIG. 5 is a digital constellation for a 64-QAM for use in accordance with a nonlimiting example of the present invention.

It should be understood that the modulation process can be described mathematically as:

$$y_k = \sum_{n=-N/2+1}^{N-1} x_n e^{ink2\pi/N}$$

where the complex $x_n$ values are taken from a digital constellation, for example, shown in FIGS. 3A, 3B, 4 and 5 for QPSK (FIG. 3A), BPSK (FIG. 3B), 16-QAM (FIG. 4) and 64-QAM (FIG. 5). In this process:

$$y_k = \sum_{n=-N/2+1}^{N/2} x_n e^{ink2\pi/N}$$
$$= \sum_{n=-N/2+1}^{N/2} a_n \cos(nk2\pi/N) - b_n \sin(nk2\pi/N) +$$
$$i \sum_{n=-N/2+1}^{N/2} a_n \sin(nk2\pi/N) + b_n \cos(nk2\pi/N)$$

$$a_n, b_n \in \{\pm 1, \pm 2, \pm 3, \ldots\}$$

which corresponds to shifting and adding $\cos(nk2\pi/N)$ and $\sin(nk2\pi/N)$. If these functions are pre-stored, no multiplications are used. As a result, the whole process can be efficiently implemented in a Digital Signal Processor (DSP) or Field Programmable Gate Array (FPGA). It should be understood also, that the system and method does not rely on the number of subcarriers being a power of two and the system and method is advantageous for an OFDM system using an arbitrary number of carriers.

Figure 6:
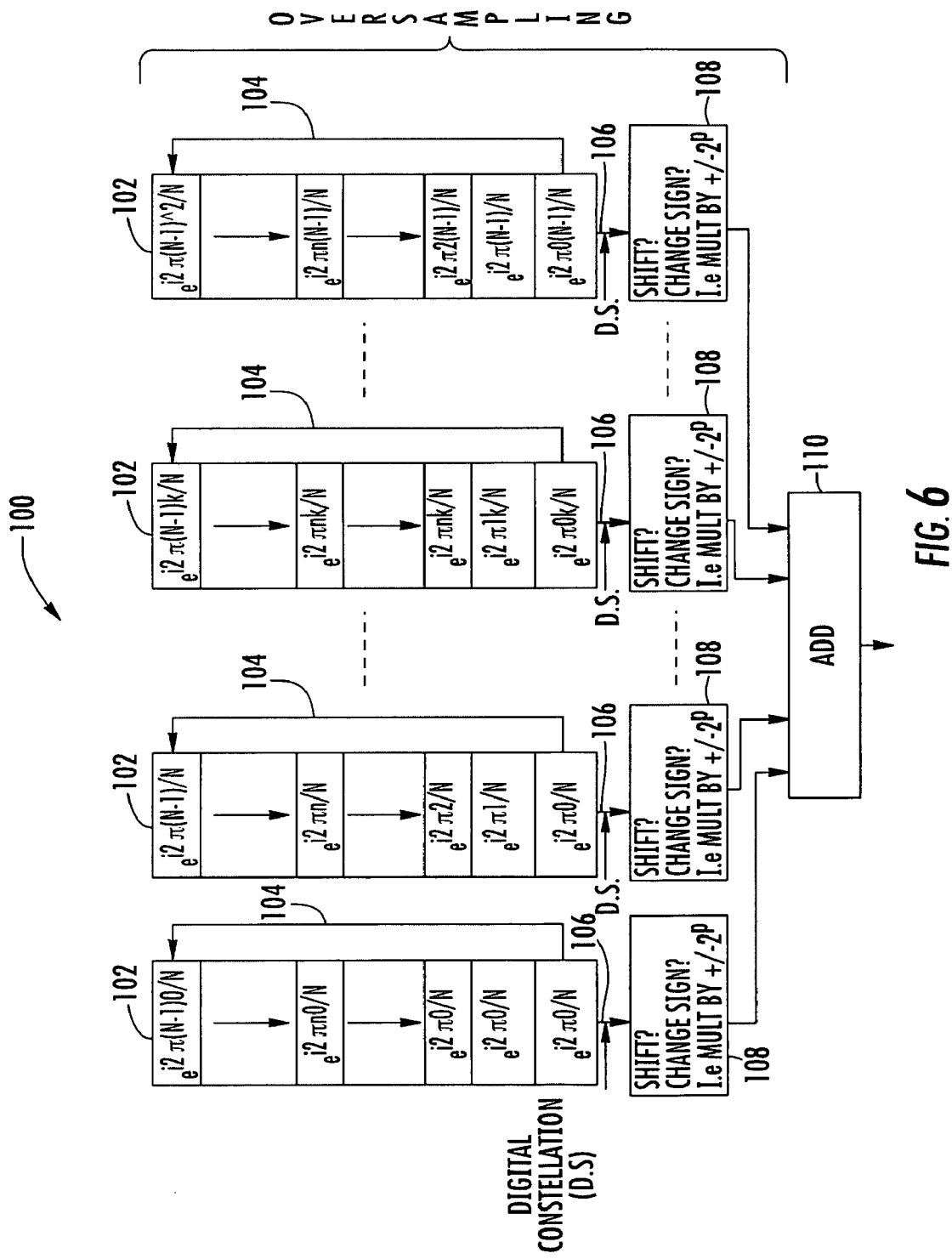
FIG. 6 is a block diagram showing basic components used in an OFDM modulation and demodulation system in accordance with a non-limiting example of the present invention.

A block diagram showing a OFDM modulation/demodulation system that can be used in accordance with a non-limiting example of the present invention is shown in FIG. 6, generally at 100, and shows a plurality of processing and memory modules 102 arranged in parallel columns, each having a feedback loop 104 and output 106 into a shift circuit 108, which could be a shift register or similar structural device. These shift circuits output into an adder or summer 110.

Each column as a separate memory module 102 corresponds to a specific frequency with the complex exponentials as shown such that no multipliers are used in the system. The modulation process occurs by adding or subtracting complex exponential functions as the basis functions with the changing frequency in each column corresponding to each subcarrier. At the output of each column before the shift circuit 108, a digital constellation symbol such as shown in FIGS. 3A, 3B, 4 and 5 is input to modulate each subcarrier. The shift register can change the sign of the complex exponential (corresponding to a subcarrier) and operate by multiplying by $+/-2^p$ in order to generate a modulated complex exponential with amplitude and phase corresponding to the input digital constellation symbol. Advantageously, a sign change can be performed using a simple two's complement and a multiply by $+/-2^p$ operation using a shift register, in accordance with a non-limiting example of the present invention. For example, if the input symbol is $\{+1, -1j\}$ from a QSPK constellation, the real part of the complex exponential is added and the imaginary part is two's complemented and added. The feedback is operative for creating the next OFDM symbol and corresponds to that process. It is possible to use the same circuit structure at the receive side for a demodulator, and thus, the circuit is operable for transmit or receive by changing the sign of the exponential from negative to positive and positive to negative for the switch. The shift circuit has the ability to accomplish a sign change by performing a two's complement operation, A shift left or shift right is used to generate a multiply by $2^p$. The value p represents the number of shifts left or right. For example, to multiply by 4, the value p=2, which corresponds to two left shifts. A positive value for p corresponds to a left shift (multiply), and a negative value of p corresponds to a right shift (divide) when the left most bit is the most significant bit. It is possible to change the sign to negative because it is a minus and accomplish logical shifts as a multiply by 2, which is then summed from each column as illustrated.

Figure 7:
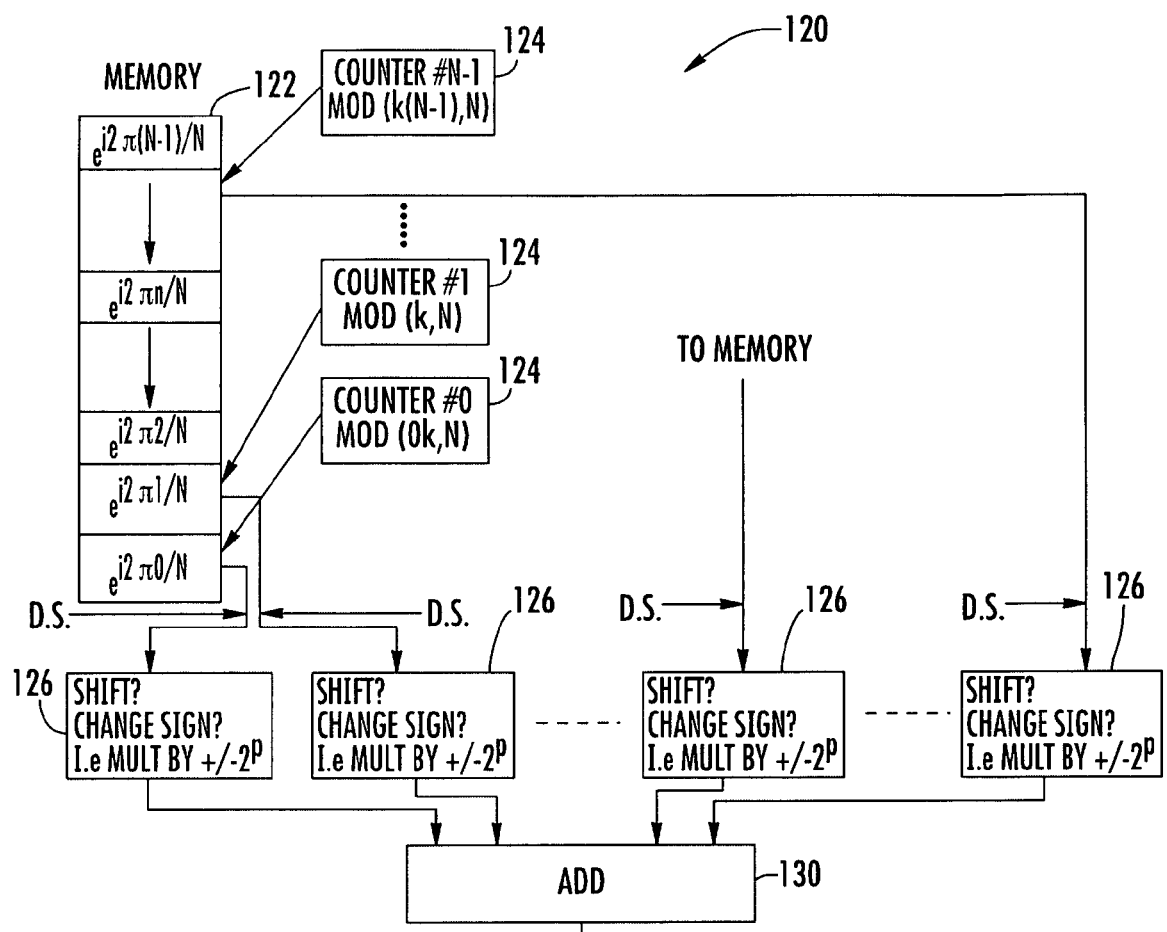
FIG. 7 is another block diagram showing an alternative system using one memory element for an OFDM modulation and demodulation system in accordance with a non-limiting example of the present invention.

FIG. 7 shows an alternative implementation for another system 120 similar to the circuit shown in FIG. 6, but using only one processing and memory module 122, which is operative with a plurality of processing counters 124, each operative with the processing and memory module 122. The module 122 outputs into a plurality of shift circuits 126 such as the same described relative to FIG. 6. These shift circuits 126 output into an adder or summer 130 such as the same as described relative to FIG. 6.

This circuit shows a number of counters 124 that are operative with the memory module 122 as a single column, in which the frequency at each of the modules for the complex exponential function can be changed in frequency by skipping samples. For example, to double the frequency, it is possible to skip every other sample, which can be accomplished through the use of the multiple processing counters, as illustrated. If the system skips every other sample, the system returns back through the memory to complete the approximation of the sine wave. Instead of storing each one of the different frequency sine waves that is a complex exponential function, it is possible to use that first column as a memory module for a low frequency sine wave that is oversampled and skip every other sample for doubling the frequency. It is possible to use every third sample to triple the frequency.

The efficiency and required memory storage as illustrated can be reduced even further by exploiting the symmetry and periodicity of the transform:
1. $W_N^{k[N-m]} = W_N^{-k \cdot n} = (W_N^{kn})^*$ (complex conjugate symmetry), and
2. $W_N^{kn} = W_N^{k \cdot (n+N)} = W_N^{(k+N)n}$ (Periodicity in n and k)

It should also be understood that the twiddle factor matrix W is also nonsingular and unitary. If A is a unitary matrix, then $$A^{-1} = A^{*T} \text{ and } AA^{*T} = I$$

It should be understood that the FFT requires storage of the N complex input sequence and twiddle factor matrix W with $N^2$ elements. Due to the symmetry and periodicity, the storage of the complete twiddle factor matrix is not necessary. There is no requirement to store all the functions when $f_n(k) = e^{ink2\pi/N}$ and $N = 2^p$. In this case it suffices to store $h(k) = \cos(k2\pi/N)$ and to use the fact that:

$$\sin(k2\pi/N) = \cos(k2\pi/N - \pi/2)$$
$$= \cos([k2\pi - \pi N/2]/N)$$
$$= \sin(k2\pi/N + 2\pi)$$
$$= \cos(k2\pi/N + 3\pi/2)$$
$$= \cos([k2\pi + 3\pi N/2]/N)$$

N/2 is an integer since N is a power of two. This is accomplished in order to evaluate $\sin(nk2\pi/N)$, find g=mod((nk−N/4)/N, N), where the operation mod(m, n) adds or subtracts n, k times to/from m until m−nk is between 0 and m−1, and use h (g). The sine value can be obtained by a 90 degrees phase shifts of cosine. Depending on the needed resolution and available memory, it is possible to use various interpolation schemes to keep the memory size down. In particular, linear interpolation can be implemented efficiently without using any multiplies. Symmetry occurs between ±n, such that one read of memory is used for two carriers. This follows from the observation:

$$\overline{f_n(k)} = f_{-n}(k) = e^{-ink2\pi/N} = \cos(nk2\pi/N) - i\sin(nk2\pi/N)$$

Symmetry between ±k, generally the index k is assumed to be between 0 and N−1, but seeing it as an index between ±N/2, the expression $$y_k = \sum_{n=-N/2+1}^{N/2} c_n e^{ink\omega/N}$$

is easily evaluated for negative values of k, once the positive values have been found.

$$y_k = \sum_{n=-N/2+1}^{N/2} x_n e^{ink2\pi/N}$$
$$= \sum_{n=-N/2+1}^{N/2} a_n \cos(nk2\pi/N) - b_n \sin(nk2\pi/N) +$$
$$i \sum_{n=-N/2+1}^{N/2} a_n \sin(nk2\pi/N) + b_n \cos(nk2\pi/N)$$

and $$y_{-k} = \sum_{n=-N/2+1}^{N/2} x_n e^{-ink2\pi/N}$$
$$= \sum_{n=-N/2+1}^{N/2} a_n \cos(nk2\pi/N) + b_n \sin(nk2\pi/N) +$$
$$i \sum_{n=-N/2+1}^{N/2} a_n \sin(nk2\pi/N) - b_n \cos(nk2\pi/N)$$

The system and method as described can be used with different basis functions other than the sine (nk2π/N) and cosine (nk2π/N) such as Welch functions or even Chebychev polynomials. It helps the receiver if the basis functions are orthogonal, but these basis functions do not need to be orthogonal.

Since the FFT requires multiplications, significant implementation loss can occur because of fixed-point rounding error. For example, when an N-Point FFT uses the radix-2 algorithm to compute the result, the DFT is computed in $v = \log_2(N)$ stages.

At each multiplication with inputs of m×m-bit, the output grows from m-bits to m+m-bits in size, where as an addition result only grows by m+1 bits in size. Thus, without rounding, the result of 6-stages of multipliers with 16-bit inputs to the FFT grows to $16 \times 2^6 = 1024$ bits, whereas 6-stages of adders grows to 16+6=22 bits. Therefore, greater rounding is required for multipliers than adders. Also, the additional output of bit-widths contributes greatly to the hardware implementation complexity (gate count on VLSI circuits) of multipliers versus adders.

Assuming the multiplication result is rounded and not truncated, and the effect of each fixed-point multiplication in the FFT can be modeled as an additive white noise generator, each error source has a variance of $$\frac{2^{-2B}}{12},$$

and B is the finite register bit-width. It is also assumed that the errors at each stage are uncorrelated at the input and output. The noise-to-signal ratio is $N^2 2^{-2B}$, which increases as 1-bit per stage. The addition of one more stage of FFT requires one more bit of resolution added to the finite register length in order to maintain the same noise-to-signal ratio.

It should be understood, at the receiver of an OFDM communication system, an FFT is performed. There is no prior knowledge of which symbols were transmitted. Therefore, most OFDM systems use the FFT as an IFFT at the transmitter and save hardware resources (gates) by reusing the FFT and performing the complex conjugate and transpose of the twiddle factors.

It should be understood that the system and method as described is advantageous because the increasing demand of wireless communications requires systems with reliability and high spectral efficiency. Many emerging wireless standards taking a large share in the market place are using OFDM for their physical layer, such as IEEE 802.11a and 802.11g (Local Area Networks), and 802.16 (Wide Area Networks). OFDM is also used as the global standard for asymmetric digital subscriber line (ADSL) and for digital audio broadcasting (DAB) in the European market. A disadvantage of the OFDM waveform is large peak-to-average power ratio (PAPR) that results from the addition of multiple sinusoids with random amplitude and phases. Due to the central-limit theorem, the dynamic range of the signal approaches a time distribution with a Gaussian distribution. These large peaks will cause intermodulation distortion if compressed by a power amplifier, resulting in an increase in the error rate. The average signal power must be kept low in order to operate the power amplifier in its linear region and prevent compression or clipping of the signal. The power consumption for a communication system is typically bound by the requirements of the final power amplifier. It is therefore important to minimize the Peak-to-Average Power Ratio (PAPR).

A system and method for reducing the PAPR is the PN-Scrambler technique used by Harris Corporation of Melbourne, Fla., which takes advantage of the fact that the probability of low-PAPR OFDM symbols occurring is frequent. The PAPR of the OFDM signal can be reduced by transmitting low-PAPR symbols, which requires a search using multiple IFFT's. The system and method in accordance with a non-limiting example of the present invention speeds up the generation of OFDM symbols by eliminating multiplications. The technique, however, still requires $$\frac{N}{\log_2(N)}$$

additional complex additions over a conventional radix-2 IFFT.

For a 1024-point FFT, this results in ~100× more complex additions. For a 64-point FFT, however, this results in ~10× more complex additions, and no multiplications compared to 192 complex multiplications. Furthermore, in accordance with a non-limiting example of the present invention, it is not necessary to perform all $N^2$ additions. Only D additions are required, where D is the number of carriers. For example, if there are only 52 carriers used, 64×52=3328 complex additions are required instead of $64^2$=4096 complex additions.

The PN-Scrambling technique as described before is a distortion-less way of reducing PAPR in OFDM systems. Since it is distortion-less, it is suitable for cascading with other methods commonly used for PAPR reduction, such as soft clipping, peak windowing, peak cancellation, or companding. This improvement in PAPR reduction can be described mathematically. If each time-domain OFDM symbol has a probability p of having a PAPR>=x dB, then k scrambling sequences reduces the probability to $p^k$. Therefore, a packet consisting of n symbols has a probability for PAPR>=x dB of $n*p^k$.

Symbol Scrambling: $p(PAPR>=x)=n \cdot p^k$

For example, with k=3 iterations and a probability of p=0.05 of PAPR>=6 dB for each OFDM symbol, the symbol scrambling method reduces the probability to 10*(0.05)^3=0.0013.

Figure 8:
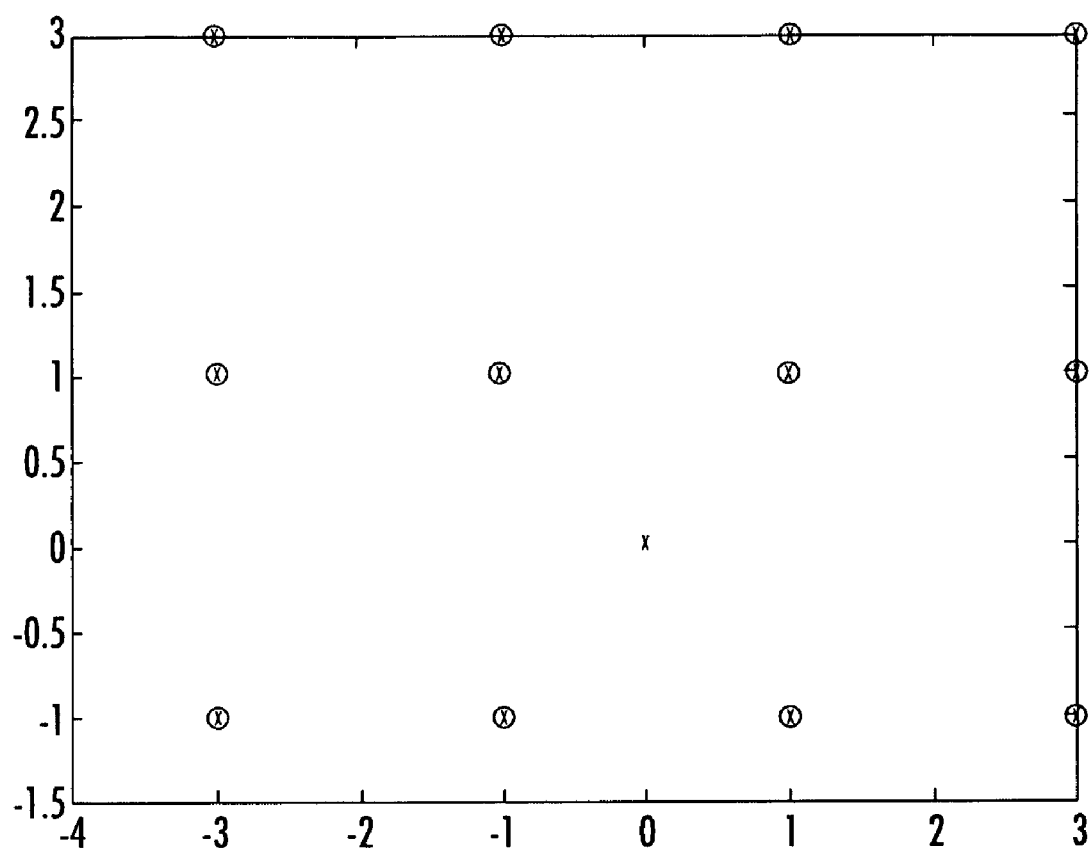
FIG. 8 is a graph showing simulation results in accordance with a non-limiting example of the present invention.
Figure 9:
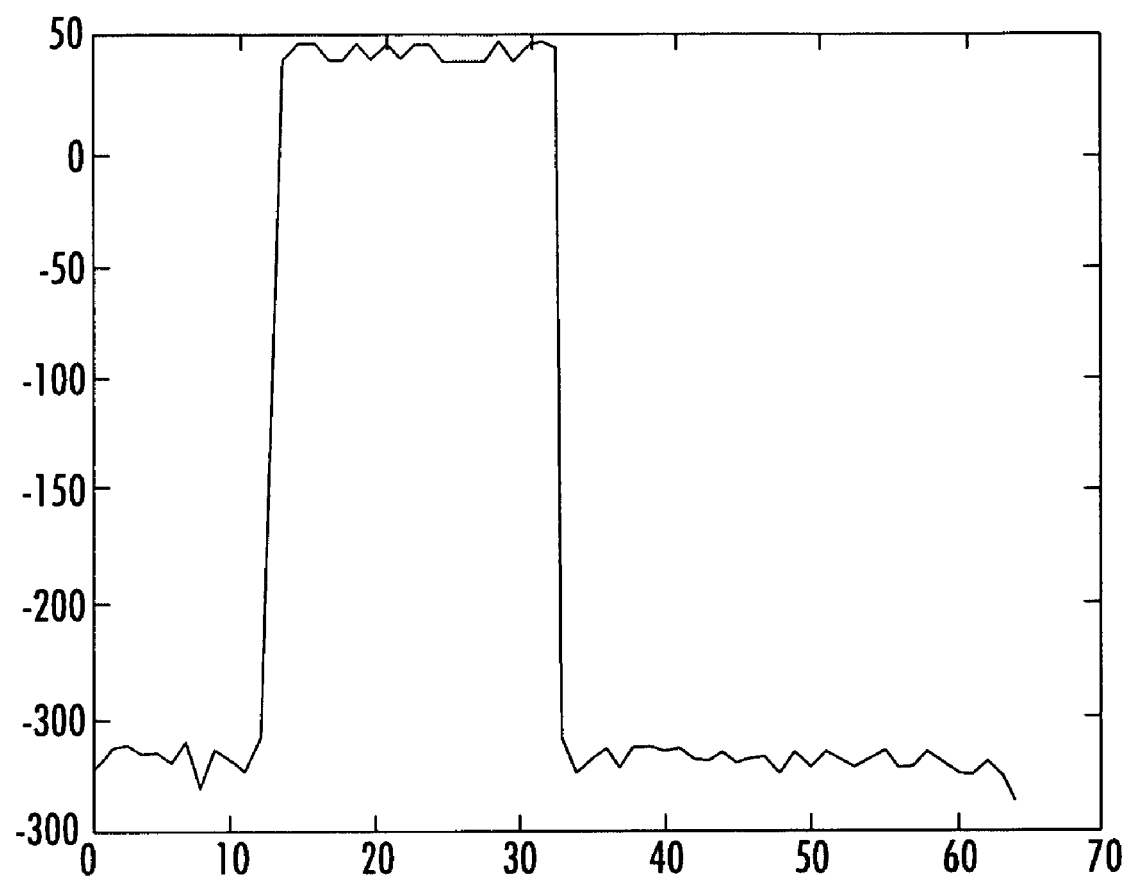
FIG. 9 is another graph showing simulation results in accordance with a non-limiting example of the present invention.

FIGS. 8 and 9 show simulation results using the system and method in accordance with a non-limiting example of the present invention.

There now follows a code example implementing an algorithm for the system and method in accordance with a non-limiting example of the present invention.

```
clc; close all; clear
fprintf('\n')
N        = 64;                    % FFT Size
soff     = floor(N/4);            % Offset for getting sine(x) from
the cossine(x) table. N must be devisable by 4.
t        = 1:N;                   % Time Index
cos_table = cos(2*pi*(t-1)/N);    % Cosine table
scal     = 0;                     % Amplitude scale value for real
/ imaginary part
% modulation = '64QAM'
modulation = '16qam'
switch lower(modulation)
    case 'bpsk'
        scal = 1;
    case 'qpsk'
        scal = 2;
    case '16qam'
        scal = 4;
    case '64qam'
        scal = 8;
    otherwise
        fprintf('Invalid Modulation')
end
Idata    = floor(rand(1,20)*scal)*2-(scal-1);
Qdata    = floor(rand(1,20)*scal)*2-(scal-1);
figure, scatter(Idata, Qdata)
Iy = 0;
Qy = 0;
for f = 1:20
% Get the real part of the output signal
    cosf = cos_table(mod((t-1)*f,N)+1);
    sinf = cos_table(mod((t-1)*f+soff,N)+1);
    switch Idata(f)
        case 1
            Iy=Iy+cosf;
        case -1
            Iy=Iy-cosf;
        case 3
            Iy=Iy+2*cosf+cosf;
        case -3
            Iy=Iy-2*cosf-cosf;
        case 5
            Iy=Iy+4*cosf+cosf;
        case -5
            Iy=Iy-4*cosf-cosf;
```

-continued

```
            case 7
                Iy=Iy+6*cosf+cosf;
            case -7
                Iy=Iy-6*cosf-cosf;
        end
        switch Qdata(f)
            case 1
                Iy=Iy-sinf;
            case -1
                Iy=Iy+sinf;
            case 3
                Iy=Iy-2*sinf-sinf;
            case -3
                Iy=Iy+2*sinf+sinf;
            case 5
                Iy=Iy-4*sinf-sinf;
            case -5
                Iy=Iy+4*sinf+sinf;
            case 7
                Iy=Iy-6*sinf-sinf;
            case -7
                Iy=Iy+6*sinf+sinf;
        end
        % Get the imag part of the output signal
        switch Idata(f)
            case 1
                Qy=Qy+sinf;
            case -1
                Qy=Qy-sinf;
            case 3
                Qy=Qy+2*sinf+sinf;
            case -3
                Qy=Qy-2*sinf-sinf;
            case 5
                Qy=Qy+4*sinf+sinf;
            case -5
                Qy=Qy-4*sinf-sinf;
            case 7
                Qy=Qy+6*sinf+sinf;
            case -7
                Qy=Qy-6*sinf-sinf;
        end
        switch Qdata(f)
            case 1
                Qy=Qy+cosf;
            case -1
                Qy=Qy-cosf;
            case 3
                Qy=Qy+2*cosf+cosf;
            case -3
                Qy=Qy-2*cosf-cosf;
            case 5
                Qy=Qy+4*cosf+cosf;
            case -5
                Qy=Qy-4*cosf-cosf;
            case 7
                Qy=Qy+6*cosf+cosf;
            case -7
                Qy=Qy-6*cosf-cosf;
        end
end
y=Iy+i*Qy;
plot(t,20*log10(abs(fftshift(fft(y)))));
figure
y2=fft(y)/N;
plot(real(y2),imag(y2),'x',Idata,Qdata,'o')
```

An efficient FFT approximation is also operable in an OFDM demodulator, in accordance with a non-limiting example of the present invention. The system and method requires no multiplications and less storage space. For example, a 1024-FFT in accordance with a non-limiting example of the present invention stores a 2-bit by 1024=2048 bits in memory.

Figure 10:
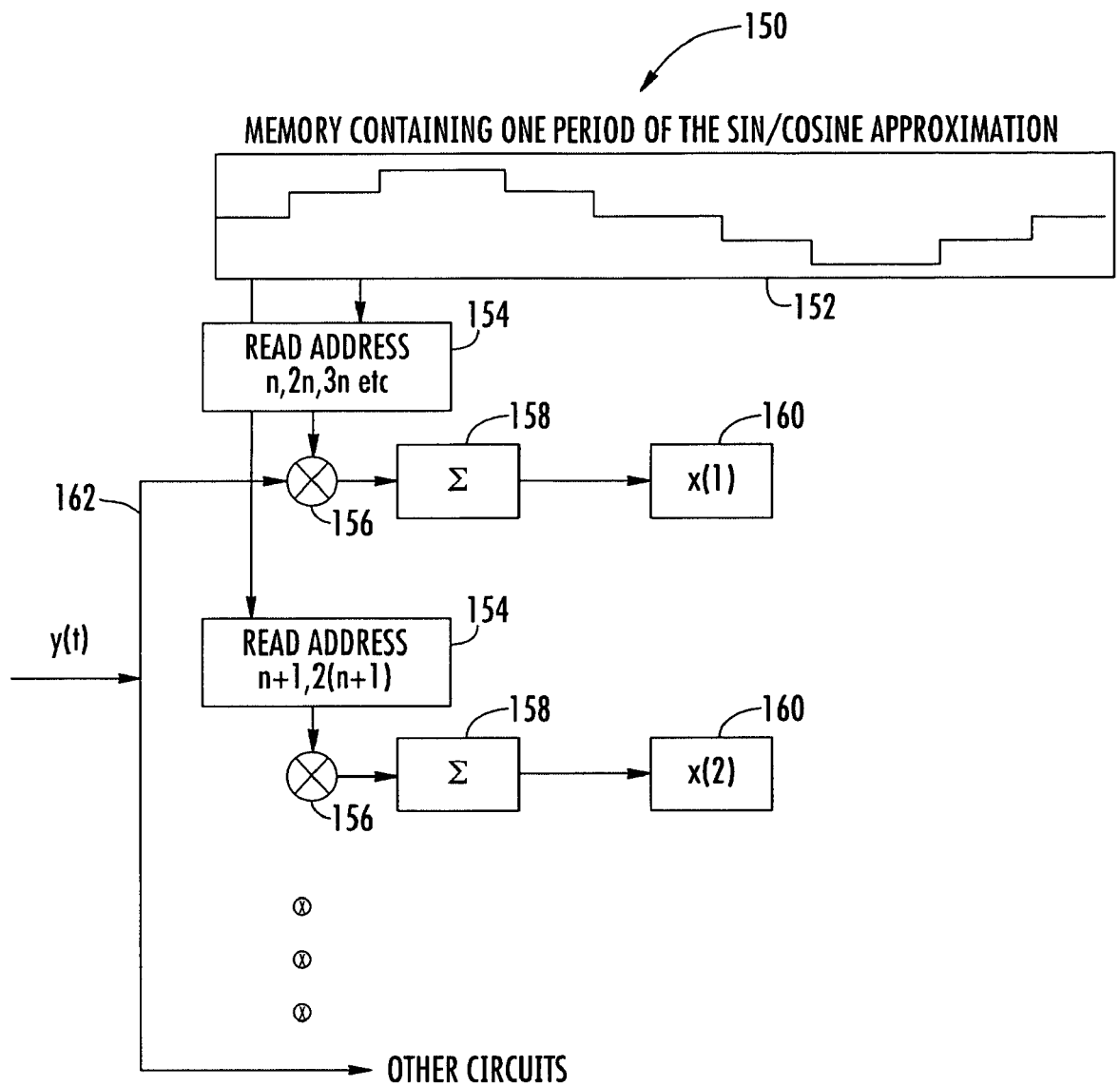
FIG. 10 is a block diagram of a portion of a demodulator circuit used in an OFDM system in accordance with a non-limiting example of the present invention.

A high-level block circuit diagram of part of a demodulator 150 in accordance with a non-limiting example of the present invention is shown in FIG. 10 and includes a processing and memory module 152 containing a period of a sine/cosine approximation, which inputs into a plurality of Read Address Circuits 154 and Mixers 156, which output into Summers 158 and Result Processing Block circuits 160 as illustrated, with appropriate feedback and mixer input 162 as illustrated.

At the receive stage, the system and demodulator do not know the phase value and amplitude that is transmitted. The channel corrupts the amplitude and phase that is transmitted. It is possible to use +1's and −1's or multilevel values with the exponentials. The signal Y(t) enters the system and a memory contains a period, for example, one period of the sine/cosine approximation. The signal Y(t) is the signal that is transmitted over-the-air with the sine wave approximation stored in memory. If the process begins at the far left, it is a sine wave, but if the process begins a couple of samples forward, then it is a cosine wave. Thus, the Y(t) signal enters when it is multiplied by values from the sine and cosine and sums together to accomplish the FFT. The sine wave at the top can represent the +1 and −1's. It is possible to operate at three level or five level and reduce down to simple logical shifts instead of multiplies. Subtractions can be simple two's complement additions.

There now follows further description relating to the modulation and demodulation of the OFDM signal in accordance with a non-limiting example of the present invention.

Both the modulation and demodulation of the OFDM signal involves a Fourier transform as noted before. This generally requires multiplications, which in turn requires significant hardware resources in the FPGA, ASICs or DSPs. The system and method uses several parts that are somewhat independent of each other. It should be understood that in one part, the description is based on the modulation being QAM, including QPSK and BPSK.

Another part is the approximation of the sine/cosine basis waveforms by square type pulses. This transforms the multiplications by sine/cosine to simple additions. Also, in another part, the oversampling of the signals places the harmonics of the square type pulses outside the bandwidth of the oversampled OFDM signal. Limiting the scope to QAM signals has the benefit of the input signal being essentially N level signals that can be decomposed into binary pulses. As a result, the Fourier transform can be transformed into simple multiplies of type +/−1, which are simple additions. Since all known OFDM systems use QAM modulation, this restriction is of no practical concern. The system and method as described can be used to approximate any OFDM modulation to any degree of precision.

Since the OFDM signal will be approximated, it is necessary to know how much distortion is acceptable. The most common forms of OFDM modulation are: QPSK, 16 QAM and 64 QAM. Since QPSK has 2 bits per symbol, 16 QAM has 4 bits per symbol, 64 QAM 8 bits per symbol, the BER's are approximately:

$$P_{B,QPSK} \cong Q\left(\sqrt{\frac{S}{N}}\right)$$

$$P_{B,16QAM} \cong 2Q\left(\sqrt{\frac{1}{5}\frac{S}{N}}\right)$$

$$P_{B,64QAM} \cong 2Q\left(\sqrt{\frac{1}{21}\frac{S}{N}}\right)$$

For about the same BER as QPSK, 16 QAM requires 7 dB and 64 QAM 13 dB higher SNR. The Required SNR for the ARIB-STD B31 Version 1.5 Japanese Digital TV standard agrees with these figures. Table 1 illustrates basic standards.

TABLE 1

Transmission Parameters and Required C/N Ratio

| Modulation Scheme | Inner Code Coding Ratio | | | | |
|---|---|---|---|---|---|
| | 1/2 | 2/3 | 3/4 | 5/6 | 7/8 |
| DQPSK | 6.2 dB | 7.7 dB | 8.8 dB | 9.6 dB | 10.4 dB |
| 16QAM | 11.5 dB | 13.5 dB | 14.6 dB | 15.6 dB | 16.2 dB |
| 64QAM | 16.5 dB | 18.7 dB | 20.1 dB | 21.3 dB | 22.0 dB |

ARIB/ISDB-T standard TX SNR

Figure 11:
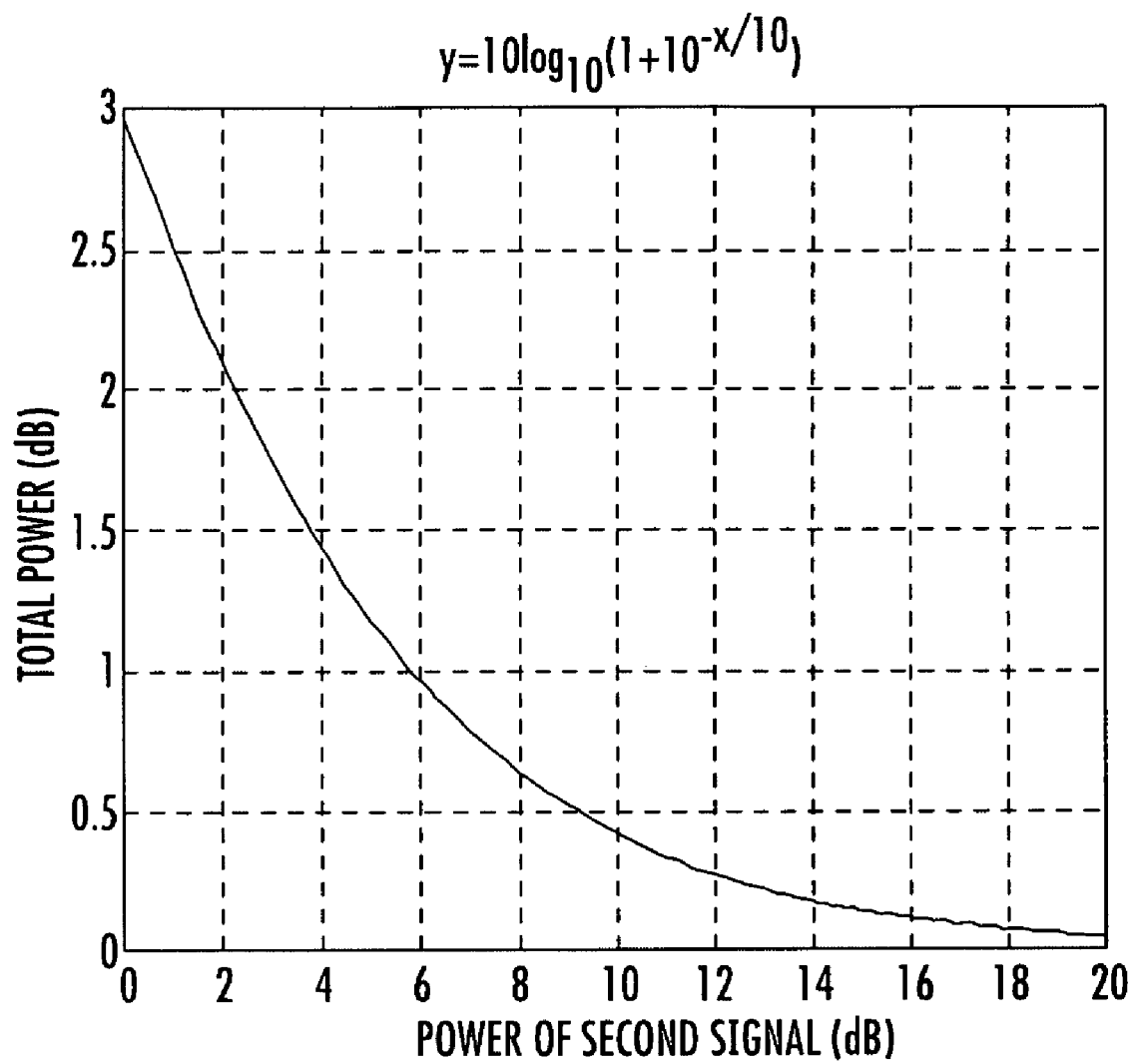
FIG. 11 is a graph showing total power (dB) versus power of a signal (dB) in accordance with a non-limiting example of the present invention.

Using the figures from the ARIB standard, the Bit Error Rates (BERs) with Signal-to-Noise Ratios (SNRs) of QPSK 10.4 dB, 16 QAM 16 dB, and 64 QAM 22 dB SNR are around 0.1%, 0.4% and 0.6%. Besides the inner code for Japanese standard, there is also a (188,204) Reed-Solomon code, which can correct for up to 8/204=4% BER. In order for the distortion in the OFDM generation not to add to more than 0.5 dB to the overall noise, it typically will be 9 dB below the noise, as shown in Table 1. If a receiver requires 20 dB S/N or better, the distortion in the OFDM signal should be around 30 dB carrying a 0.5 dB noise penalty. As a result, the receiver will require a 20.5 dB S/N. If a 1 dB noise penalty is acceptable, the distortion should be around 6 dB below the noise level as shown in the graph of FIG. 11, showing the total power in dB on the vertical axis and power of a second signal in dB on the horizontal axis.

It should be apparent that a QPSK system typically has an inherent error of less than 20 dB, 16 QAM better than 26 dB and 64 QAM better than 32 dB. If a 1 dB degradation is acceptable, the inherent error could be less than 16 dB, 22 dB, and 28 dB (i.e., 4 dB less).

As noted above, an OFDM signal is a complex linear combination of the basis function sin(nωt) and cos(nωt). If the length of the symbol is T=1/ω, the basis functions becomes orthogonal. In order to provide resistance to multipath propagation, the actual transmitted OFDM symbols are generally longer than T.

$$OFDM = \sum_n a_n \cos(n\omega t) + b_n \sin(n\omega t)$$
$$= \sum_n c_n \exp(in\omega t) \quad a_n, b_n, c_n \in C.$$

It is possible to generalize the OFDM concept to use other basis functions, i.e.:

$$OFDM = \sum_n c_n f_n(t)$$

The requirements on the basis functions $f_n(t)$ are that they form a basis, i.e. are linearly independent. In order to make the detection more simple, they are also orthogonal over some time interval T, but do not necessarily have to span the space. It is not difficult to add more functions so that they do.

An example of functions $f_n(t)$ are hard-limited versions of the sin(nωt) and cos(nωt), $f_n(t)$=sign(sin(nωt)), Hadamar sequences or even Chebychev polynomials etc. If the system has two sets of basis function $f_n(t)$ and $g_n(t)$, both span the space and basic linear algebra such that one can represent a signal using either basis function. If the two basis functions do not span the space, it is possible to obtain a good approximation of one signal using the other set of basis functions.

A hard-limited version of a sinusoid will have a spectrum given by $$f_1(t) = \text{sign}(\sin(\omega t)) = \sum_{p=0}^{\infty} \frac{4/\pi}{2p+1} \sin((2p-1)\omega t).$$

Besides the energy at the fundamental frequency ω, there is also energy at the odd multiples 3ω, 5ω etc. Thus, square waves with fundamental frequencies in the range $\omega_1 < \omega < 3\omega_1$ will span the same space as sinusoids with frequencies in the same range. Furthermore if $$f_n(t) = \text{sign}(\sin(\omega_n t)) \text{ and } g_m(t) = \sin(\omega_m t), \text{ then } \int_{-\infty}^{\infty} g_m \overline{f_n(t)} dt = 0$$

as long as $\omega_1 < \omega_{n,m} < 3\omega_1$ and $\omega_n \neq \omega_m$, and $$\int_{-\infty}^{\infty} g_m(t) \overline{f_m(t)} dt = \infty.$$

If the system calculates the Fourier transform of a signal with a frequency support of $\omega_1 < \omega < 3\omega_1$, the system calculates ∫m(t)sign(cos(ωt))+i·sign(sin(ωt))dt. This only involves multiplying the signal m(t) with +/−1. The Fourier transform can be found by adding and subtracting. The multiplications are avoided.

For an OFDM signal with a frequency spacing of 1/T, and the basis function with frequencies ω=ω₁+n2π/T $\omega_1 \leq \omega < 3\omega_1$, it will be orthogonal over the interval [0,T], in addition to [−ω,ω]. The discrete Fourier transform and the fast Fourier transform can both be accomplished without any multiplications. As a result, the OFDM signal can be generated and demodulated using no multiplies when the system limits its frequency range to $\omega_1 < \omega < 3\omega_1$. As a result, the OFDM signal is placed on an IF frequency (such as useful for communications) or demodulated from an IF frequency instead of a baseband signal.

The two signals $OFDM_g = \Sigma c_n g_n(t)$ and $$OFDM_f = \frac{\pi}{4} \sum c_n f_n(t)$$

are not identical, $OFDM_f \neq OFDM_g$. The inner products are identical.

$$c_m = \frac{1}{T} \int_0^T \sum c_n g_n(t) \overline{g_m(t)} dt$$
$$= \frac{4}{\pi T} \int_0^T \sum c_n g_n(t) \overline{f_m(t)} dt.$$

Figure 12A:
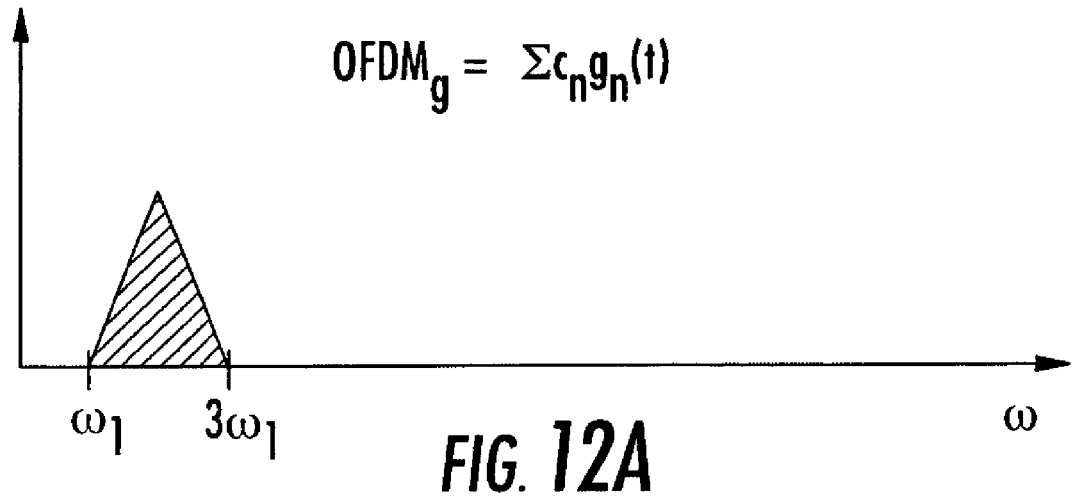
FIGS. 12A and 12B are spectral comparisons of signals in accordance with a non-limiting example of the present invention.
Figure 12B:
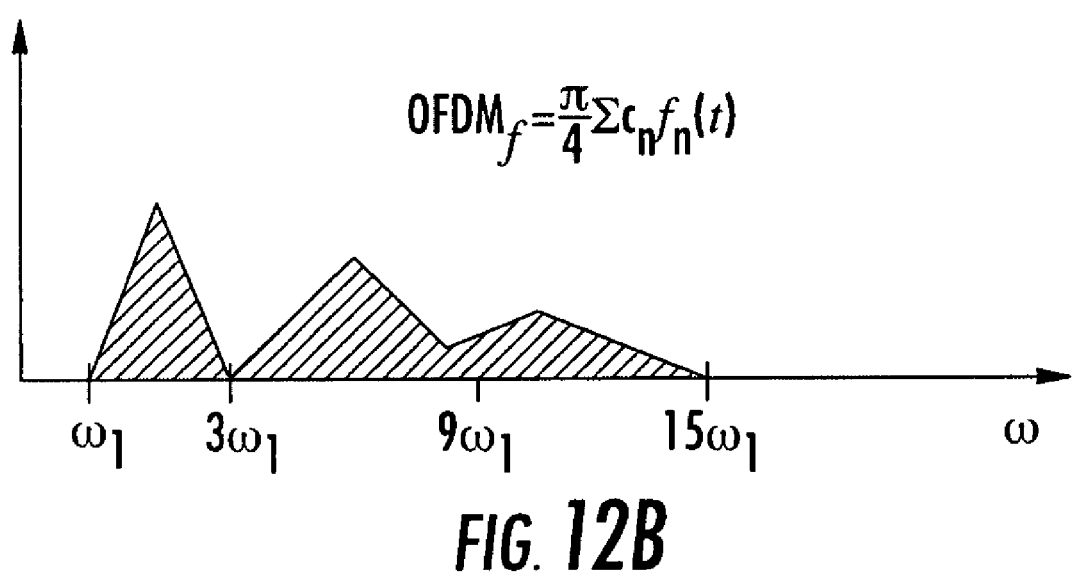

This can be the result of the choice of basis functions and the assumed band limitation. This is shown in the graphs of the frequency domain in FIGS. 12A and 12B. Within the bandwidth $\omega_1 < \omega < 3\omega_1$, the two signals are identical as shown in FIGS. 12A and 12B.

Outside this bandwidth they are not the same. The harmonics present in the second signal $$OFDM_f = \frac{\pi}{4} \sum c_n f_n(t) \quad 5$$

causes some practical problems. In the receiver, this is only an issue for a sampled signal, in which case some of the harmonics will fold back into the bandwidth $\omega_1<\omega<3\omega_1$. In a modulator the images are filtered. In order that unrealistic filters are not required, the bandwidth should be limited so that there is a reasonable transition bandwidth between the fundamental and the first image. For example, it is possible to use a bandwidth of $\omega_1<\omega<2\omega_1$. If the modulation process is digital, which is the most likely, some of the images will fold down in the same way as in the receiver.

Figure 13:
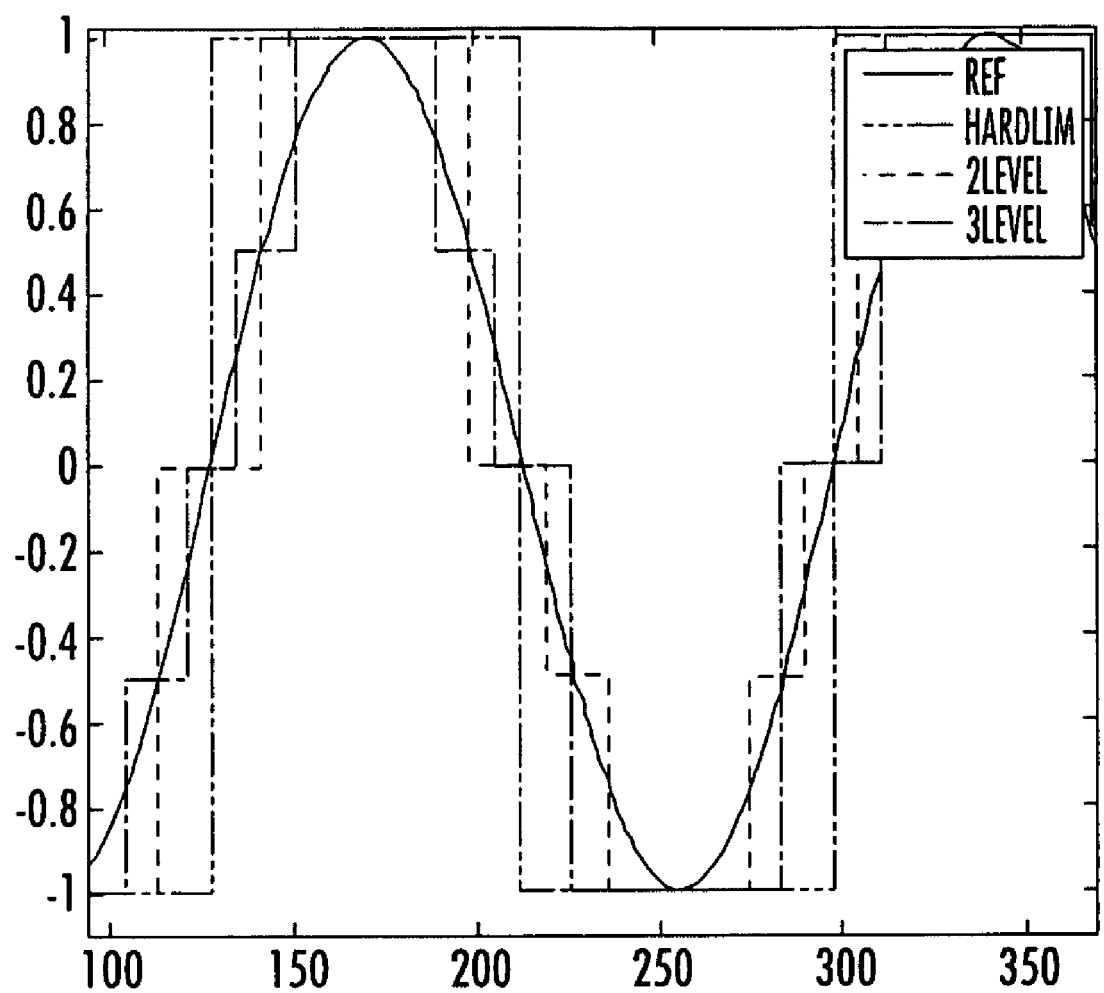
FIG. 13 is a graph showing different approximations of a sinusoid in accordance with a non-limiting example of the present invention.

Since a square wave's (hard-limited sinusoid) spectrum decays as 1/n, the power in harmonics are $$P_{Harmonics}(N) = 2\pi - \sum_{n=1}^{N} \frac{4/\pi}{(2n-1)^2}$$

where N−1 corresponds to the case where all the harmonics are included. In the case of folding, the formula becomes an approximation of the power in the folded signal. It is only approximate since some components can fold on top of each other, in which case they are no longer independent. As the bandwidth increases, the total energy in the harmonics will decay as 1/N. For every doubling of the sampling rate, the total energy that folds down will decrease by about 3 dB. Another way to decrease the energy in the harmonics is to modify the waveforms. A first approach is to use modified square wave. A second approach is to use more levels as shown in FIG. 13.

Figure 14:
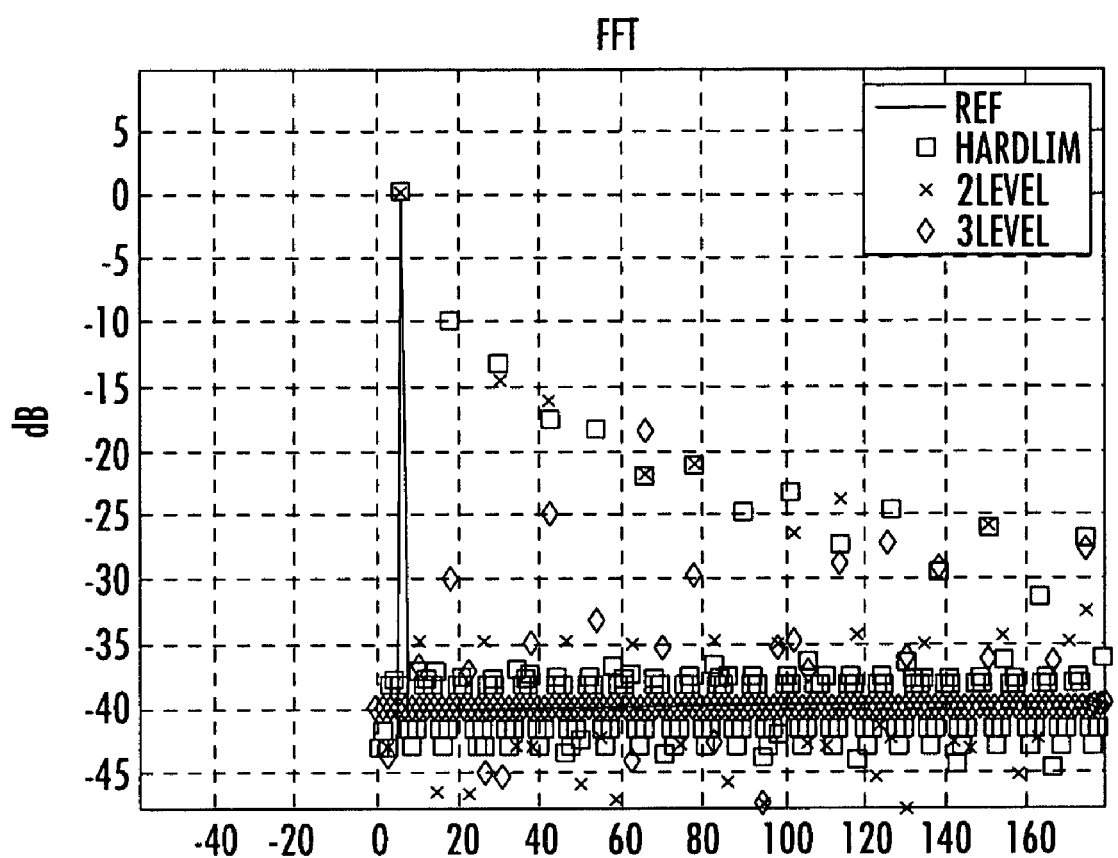
FIG. 14 is a graph with FFT showing the spectra of signals as shown in FIG. 13 in accordance with a non-limiting example of the present invention.

The spectra for the FFT of these signals is shown in FIG. 14. They decay as 1/N. The two-level signal, however, lacks some of the harmonics of the hard-limited signal such as at 3ω and 9ω etc. The three level signal's strongest harmonics is at 11ω. Using the two level signal instead of the hard-limited signal as the basis functions simplifies the Fourier transform even further since some of the multiply by +/−1 operations are replaced by multiply by 0. Because the harmonics at 3ω are gone, a lower sampling rate is possible without causing more folding, or making the filtering after A/D conversion easier by providing more separation between the signal and its images.

The three-level signal, which takes the values 0, +/−½ and +/−1 requires the Fourier transform (demodulation/modulation process) to multiply with one-half in addition to 1. Another approach is to split the signal $f_n(t)$ into two functions, each taking on the values +/−1.

$$f_n(t) = f_{n,1}(t) + \frac{1}{2} f_{n,2}(t)$$

$$OFDM_f = \sum c_n f_n(t)$$

$$= \sum c_n f_{n,1}(t) + \frac{1}{2} \sum c_n f_{n,2}(t)$$

$f_{n,1}, f_{n,2} \in \{-1, 0, 1\}.$

This can be seen as adding one more bit to the signal, which is expanded on $$OFDM_f = \sum c_n f_n(t)$$

-continued $$= \sum c_n f_{n,1}(t) + \frac{1}{2} \sum c_n f_{n,2}(t) +$$

$$\frac{1}{4} \sum c_n f_{n,3}(t) + \ldots f_{n,i} \in \{-1, 0, 1\}$$

One skilled in the art can make the tradeoff between the amount of oversampling and the number of levels to use in the waveform. An optimum tradeoff will depend on the available hardware. By doubling the sample rate (increased oversampling), the system can gain around 3 dB. By adding an extra bit, the system gains about 6 dB. This is a similar tradeoff as with A/D converters for example, a 3 dB noise gain when doubling the sampling rate and a 6 dB gain when adding an extra bit.

There now follows description of various results obtained in simulations. A QPSK OFDM system with three different signals/functions was used in one simulation to "demodulate." Three cases with no oversampling, and three times and five times oversampling were simulated. The bandwidth was set according to $\omega_0<\omega<5\omega_0<fs/2$, such that the setup was not optimal for the hard-limited sine/cosine case.

Figure 15:
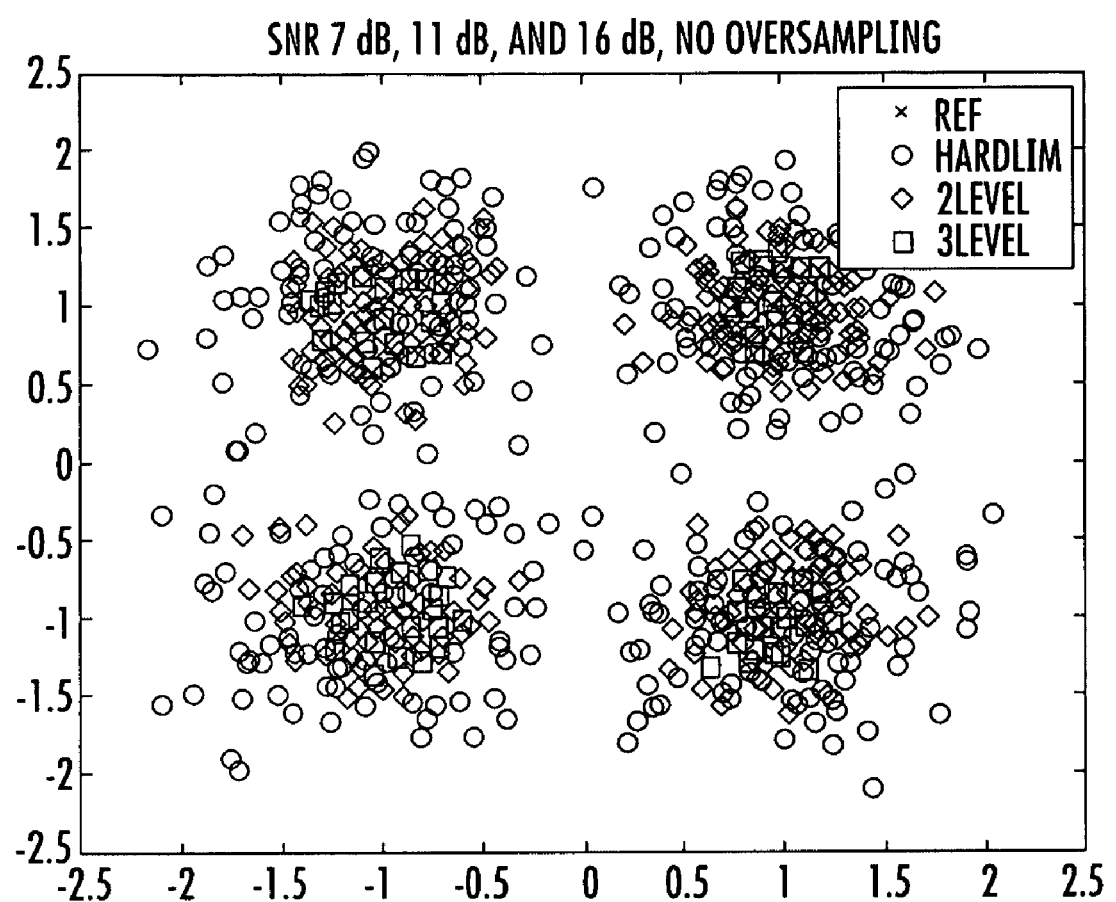
FIG. 15 is a graph showing no over sampling and signal-to-noise (SNR) of 7 dB, 11 dB and 16 dB in accordance with a non-limiting example of the present invention.
Figure 16:
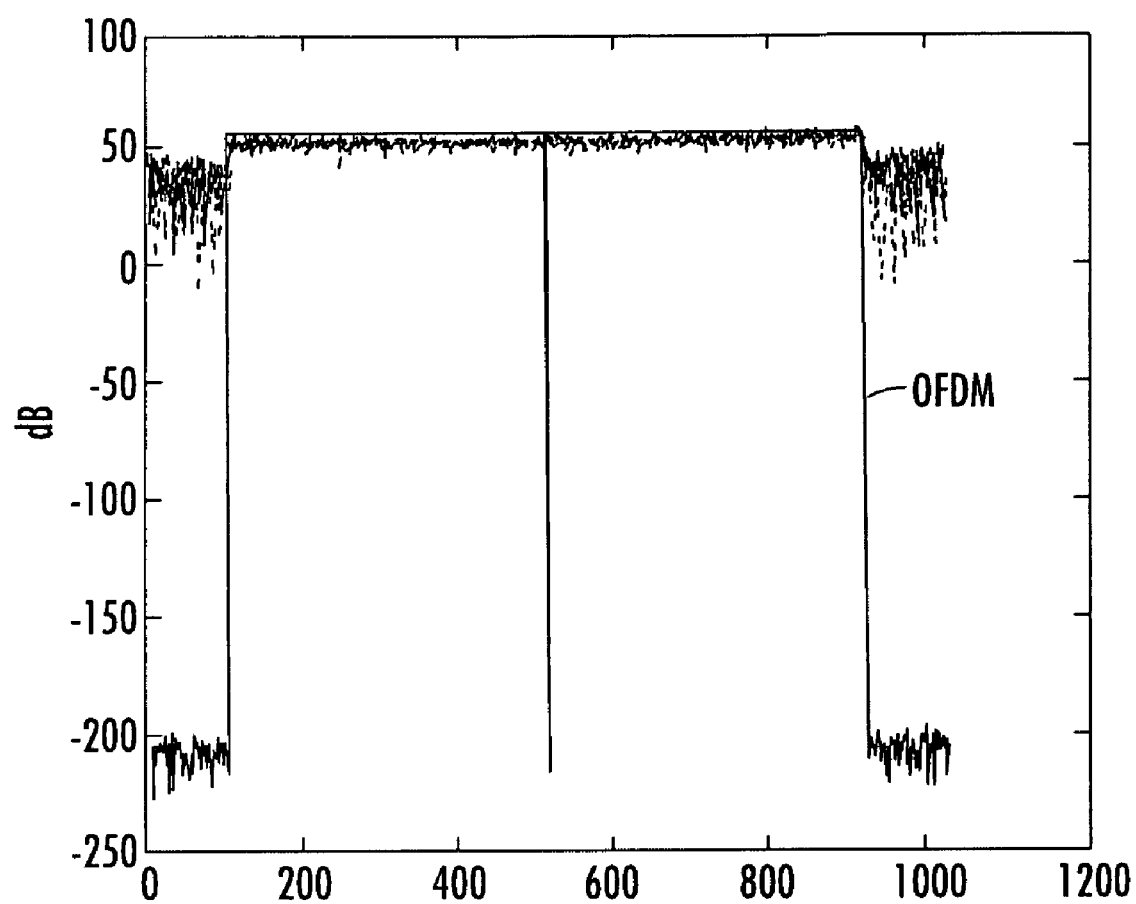
FIG. 16 is a graph showing the spectra and no over sampling in accordance with a non-limiting example of the present invention.
Figure 17:
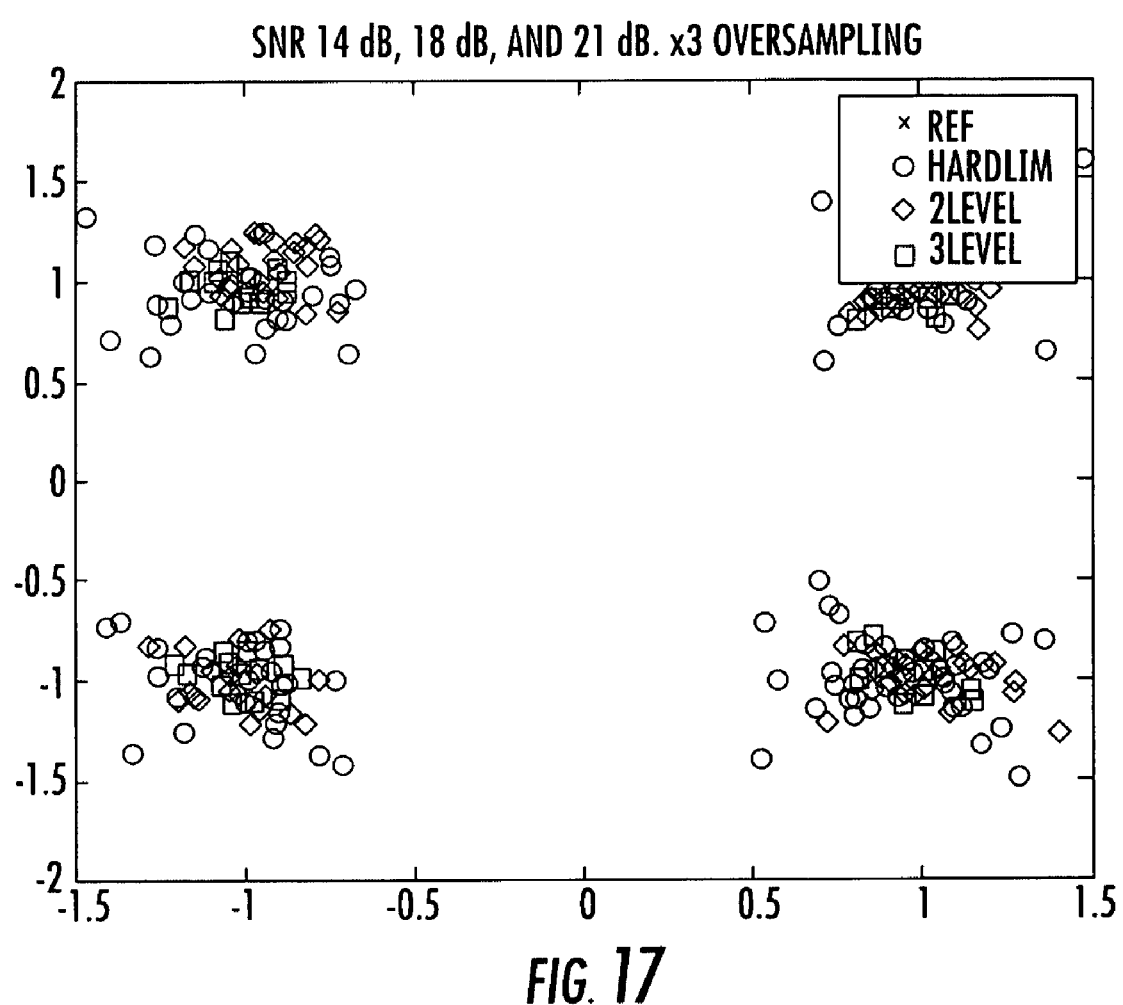
FIG. 17 is a graph showing three times over sampling with an SNR of 14 dB, 18 dB, and 21 dB in accordance with a non-limiting example of the present invention.
Figure 18:
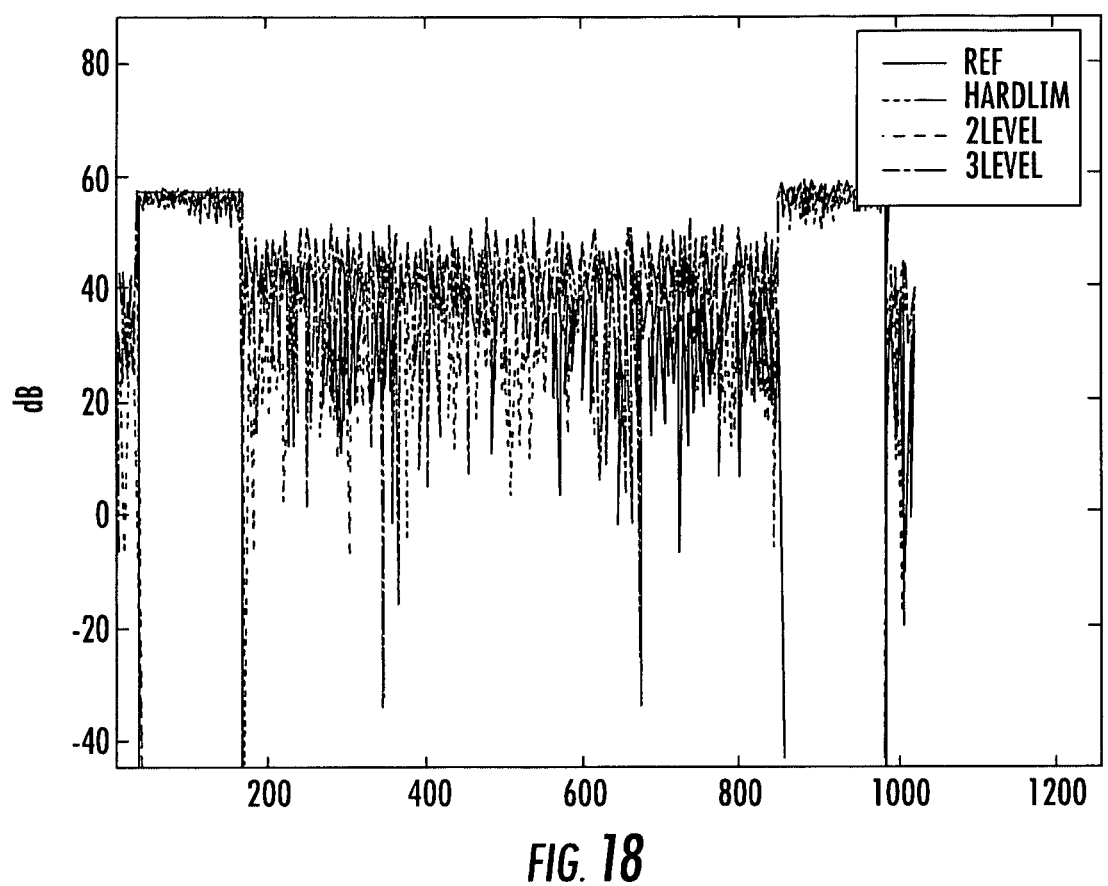
FIG. 18 is a graph showing the spectra with three times over sampling in accordance with a non-limiting example of the present invention.
Figure 19:
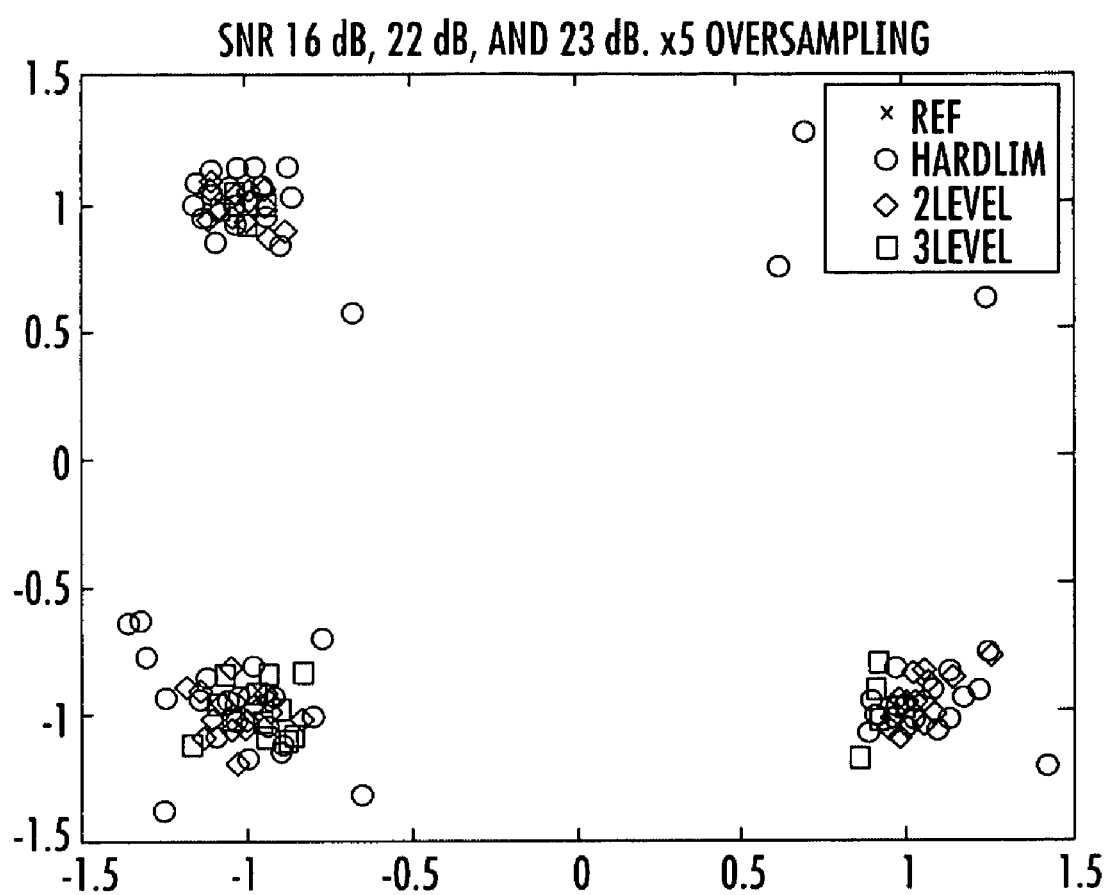
FIG. 19 is a graph showing five times over sampling and SNR of 16 dB, 22 dB and 23 dB in accordance with a non-limiting example of the present invention.
Figure 20:
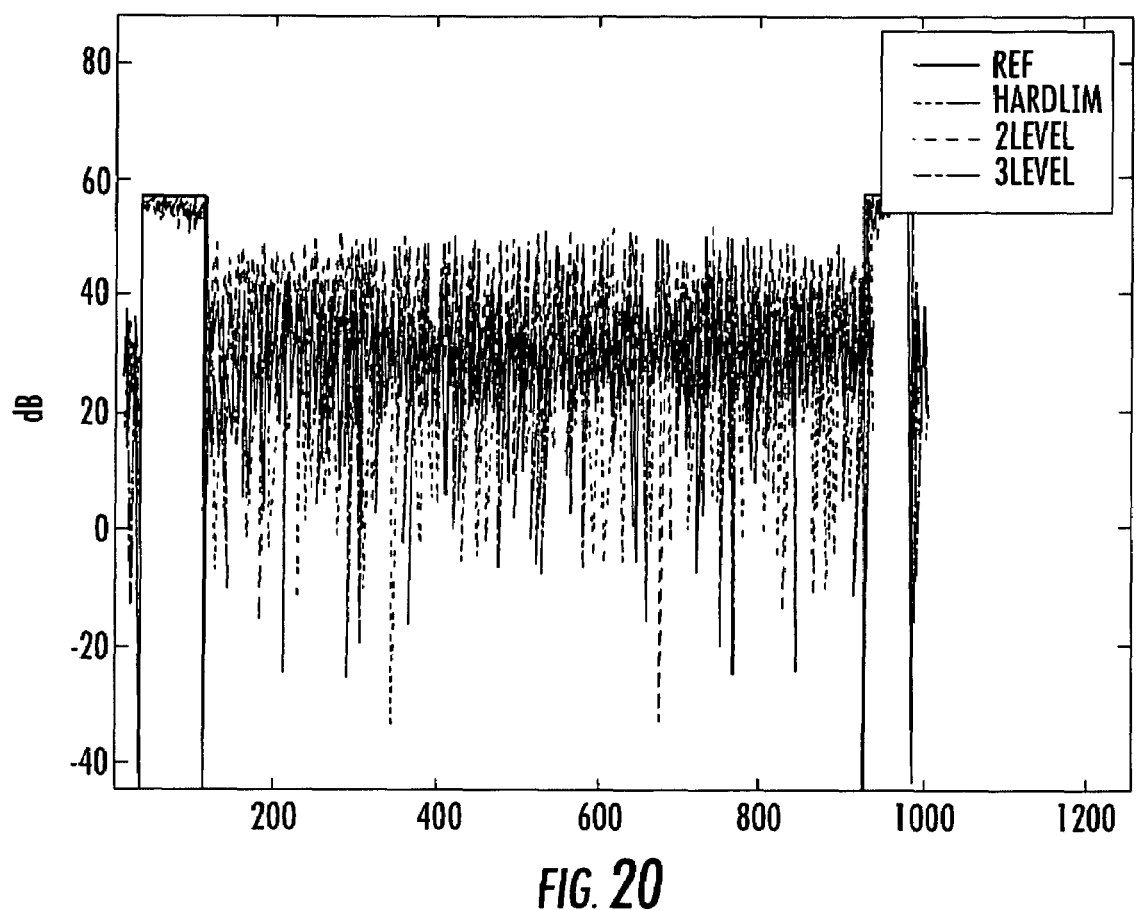
FIG. 20 is a graph showing the spectra of five times over sampling in accordance with a non-limiting example of the present invention.

FIGS. 15 and 16 show the respective graphs with no oversampling and the spectra in FIG. 16, where the OFDM signal and the sum of all the carriers used to demodulate the signal, i.e., $\Sigma f_n(t)$. The graphs illustrate the error caused by approximating sine/cosine with the various functions (Hardlim, 2 level and 3 level). It is assumed that the distortion caused by the folding of the harmonics is Gaussian and the graph gives an idea about the error. The Gaussian assumption in some instances possibly is not as accurate since only a few harmonics fold on top of a particular carrier. At this particular carrier frequency, one of the harmonics will dominate. It is questionable if the central limit theorem applies, but assuming the error to be Gaussian should give a good idea about what Bit Error Rate (BER) the system could expect. Comparing the error on each carrier to the error in the demodulated signal in the case of no oversampling and using the full spectra (i.e., the OFDM signal covers the spectra from 0−fs/2), the error on the carriers occurs at 3.4340 dB, 14.5901 dB, and 20.3684 dB. The error on the demodulated signals were 6 dB, 15 dB, and 20 dB. For the hard-limited signal, there is a significant difference, which implies that the assumption of Gaussian error is probably not valid in that case while it becomes more reasonable as the number of levels increases.

The simulations in FIGS. 16-20 show that it is possible to obtain SNRs from about 11 dB to 20 dB, (2 level/no oversampling, 3 level/2× oversampling). To obtain a signal with 30 dB distortion which would suit 64-QAM, a signal with one more bit will work. This signal will have 3 bits and a sign bit. Another alternative is to use the 3 level signal and oversample by 6. This system as described is suited for QPSK, 16 QAM, possibly for 64 QAM.

It should be understood from the preceding that the present invention describes an efficient IFFT for use as an OFDM modulator and an efficient FFT for use as an efficient OFDM demodulator. Advantageously, the invention describes techniques to perform the IFFT modulation and FFT demodulation without using any multipliers. Thus, the modulator and demodulator can be implemented using only logical shifts, two's complement, and adders. Since the implementation complexity is determined by the number of multipliers, the invention provides significantly less implementation complexity, lower number of gates, and lower system power consumption.

On the transmitter side, the complex exponentials can be accurately stored in memory using full precision, and the subcarriers modulated using logical shifts and two's complements operations corresponding to the input digital constellation symbol value to be transmitted. This technique takes advantage of the simple digital constellation integer values. Multipliers present much more rounding error due to significant bit growth, as discussed in the preceding. Since this technique does not require multiplications, significant rounding error is avoided and the invention presented allows more accuracy in the transmitter than the conventional IFFT OFDM modulators. Thus, the present invention describes a IFFT modulator that is distortion-less and does not require multiplications.

On the receiver side, the input into the FFT is no longer simple integer digital constellation symbols. Instead, the input to the receiver's FFT consists of the output of the transmitter plus random amplitude and phase perturbations added to the signal by the transmission channel. A separate technique was described in the preceding to allow removal of multiplications for an efficient FFT implementation in an OFDM receiver. This technique uses approximations of complex exponentials in order to convert the FFT operations into simple logical shifts, two's complement, and adders. The disadvantage of this technique is that it is not distortion-less like the transmitter IFFT OFDM modulator described above. It will be appreciated that the presented FFT demodulator uses oversampling and multilevel sinusoidal approximations in order to reduce the in-band harmonic distortion, in accordance with the present invention.

Efficient storage of the complex exponentials was discussed in the preceding and is applicable to both the IFFT modulator and the FFT demodulator, in accordance with the present invention. The complete storage of the complex exponentials would normally require both the real (cosine) and imaginary (sine) components to be stored in memory (or generated as needed) for each subcarrier. Since the sine can be derived from the cosine, only the real-part needs to be stored. Secondly, since each frequency is an integer multiple of the lowest frequency sinusoid, only the lowest frequency sinusoid needs to be stored. Thus, all of the complex exponentials can be generated from one sinusoid. Advantageously, use of this invention does not restrict the number of subcarriers N to a power of 2.

An example of a radio that can be used with such system and method is a Falcon™ III radio manufactured and sold by Harris Corporation of Melbourne, Fla. The Falcon™ III can include a basic transmit switch, and other functional switches and controls known to those skilled in the art. It should be understood that different radios can be used, including but not limited to software defined radios that can be typically implemented with relatively standard processor and hardware components. One particular class of software radio is the Joint Tactical Radio (JTR), which includes relatively standard radio and processing hardware along with any appropriate waveform software modules to implement desired communication waveforms. JTR radios also use operating system software that conforms to the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 21:
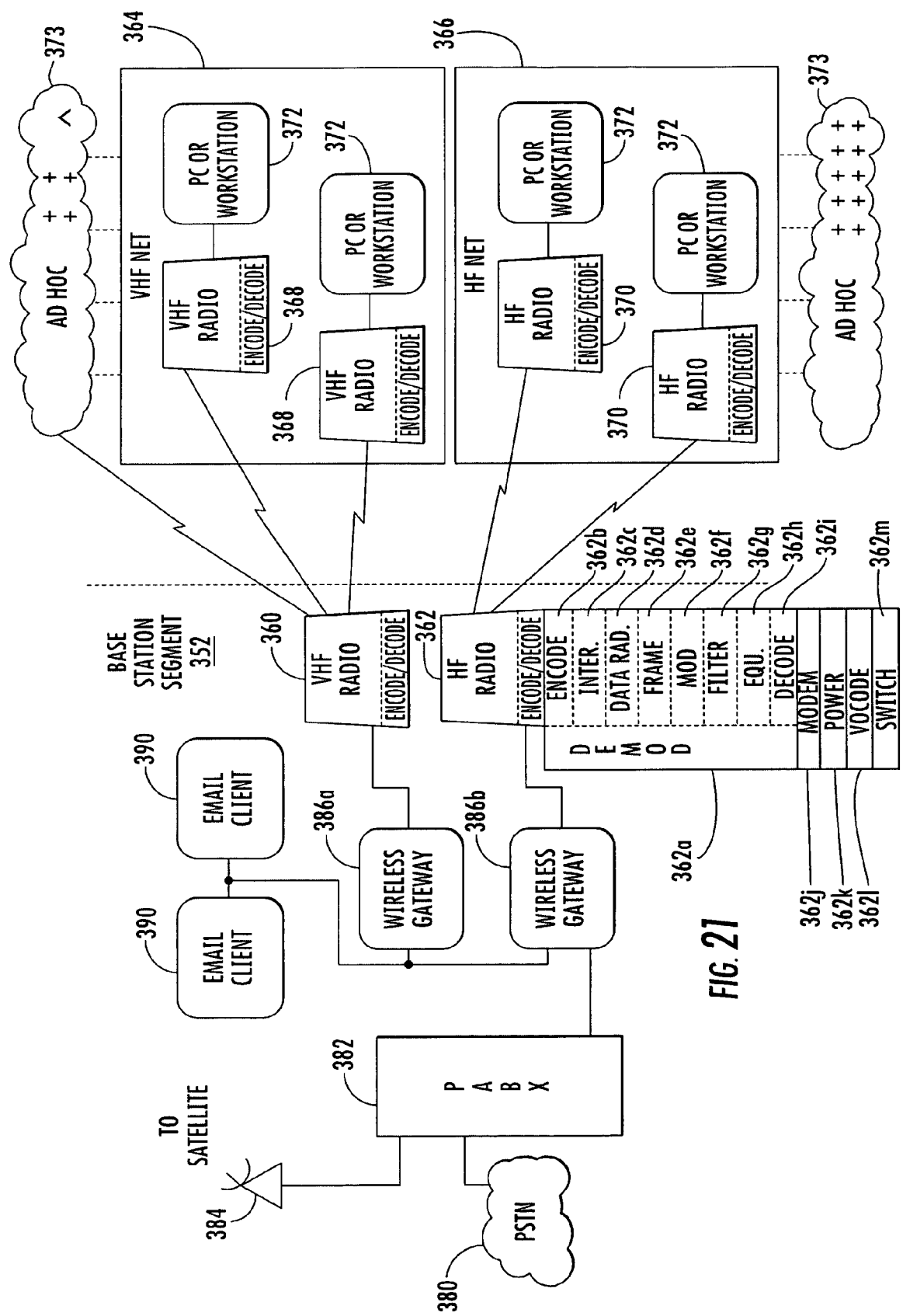
FIG. 21 is a block diagram of an example of a communications system that can be used in accordance with a non-limiting example of the present invention.

For purposes of description only, a brief description of an example of a communications system that would benefit from the present invention is described relative to a non-limiting example shown in FIG. 21. This high-level block diagram of a communications system 350 includes a base station segment 352 and wireless message terminals that could be modified for use with the present invention. The base station segment 352 includes a VHF radio 360 and HF radio 362 that communicate and transmit voice or data over a wireless link to a VHF net 364 or HF net 366, each which include a number of respective VHF radios 368 and HF radios 370, and personal computer workstations 372 connected to the radios 368, 370. Ad-hoc communication networks 373 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 362$a$ and appropriate convolutional encoder circuit 362$b$, block interleaver 362$c$, data randomizer circuit 362$d$, data and framing circuit 362$e$, modulation circuit 362$f$, matched filter circuit 362$g$, block or symbol equalizer circuit 362$h$ with an appropriate clamping device, deinterleaver and decoder circuit 362$i$ modem 362$j$, and power adaptation circuit 362$k$ as non-limiting examples. A vocoder (voice encoder/decoder) circuit 362$l$ can incorporate the encode and decode functions and a conversion unit which can be a combination of the various circuits as described or a separate circuit. A transmit key switch 362$m$ is operative as explained above. These and other circuits operate to perform any functions necessary for the present invention, as well as other functions suggested by those skilled in the art. The circuits referenced here may include any combination of software and/or hardware elements, including but not limited to general purpose microprocessors and associated software, specialized microprocessors for digital signal processing and their associated software, Application Specific Integrated Circuits (ASICs), Field Programmable Gate Arrays (FPGAs), logic circuits, or other kinds of devices and/or software or firmware known to those skilled in the art. Other illustrated radios, including all VHF mobile radios and transmitting and receiving stations can have similar functional circuits.

The base station segment 352 includes a landline connection to a public switched telephone network (PSTN) 380, which connects to a PABX 382. A satellite interface 384, such as a satellite ground station, connects to the PABX 382, which connects to processors forming wireless gateways 386a, 386b. These interconnect to the VHF radio 360 or HF radio 362, respectively. The processors are connected through a local area network to the PABX 382 and e-mail clients 390. The radios include appropriate signal generators and modulators. The packetized or non-packetized digital voice information transmitted within the network using the techniques of the present invention can originate at or be delivered to a handset connected to one of the radios, a telephone or other interface device attached to a wireless gateway device such as the RF-6010 Tactical Network Hub, or a subscriber telephone connected to the PABX or within the public switched telephone network.

An Ethernet/TCP-IP local area network can operate as a "radio" mail server. E-mail messages can be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, can be used with legacy wireless devices. Examples of equipment that can be used in the present invention include different wireless gateway and radios manufactured by Harris Corporation of Melbourne, Fla. This equipment includes RF5800, 5022, 7210, 5710, 6010, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps or higher with a radio set to ISB mode and an HF modem set to a fixed data rate. It is possible to use code combining techniques and ARQ.

Figure 22:
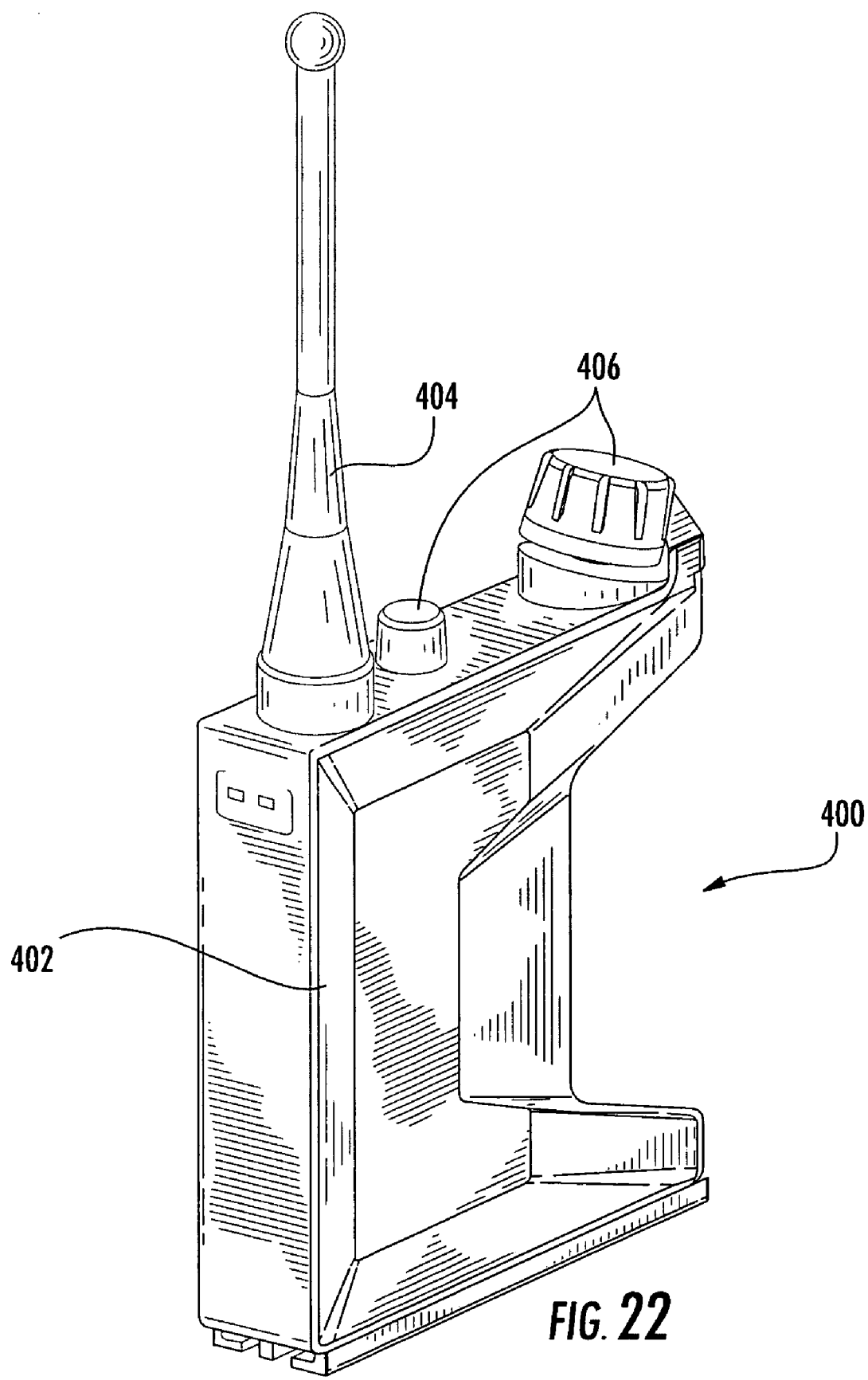
FIG. 22 is a perspective view of a portable wireless communications device as a handheld radio that can incorporate the communications system in accordance with a non-limiting example of the present invention.

The system and method, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 400 as illustrated in FIG. 22. The portable wireless communications device is illustrated as a radio that can include a transceiver as an internal component and handheld housing 402 with an antenna 404 and control knobs 406. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the transceiver using SCA and the efficient FFT circuit in accordance with non-limiting examples of the present invention. An example of a communications device that could incorporate the efficient FFT circuit, in accordance with non-limiting examples of the present invention, is the Falcon® III manpack or tactical radio platform manufactured by Harris Corporation of Melbourne, Fla.

This application is related to copending patent applications entitled, "SYSTEM AND METHOD FOR COMMUNICATING DATA USING EFFICIENT FAST FOURIER TRANSFORM (FFT) FOR ORTHOGONAL FREQUENCY DIVISION MULTIPLEXING (OFDM) DEMODULATION," and "SYSTEM AND METHOD FOR COMMUNICATING DATA USING EFFICIENT FAST FOURIER TRANSFORM (FFT) FOR ORTHOGONAL FREQUENCY DIVISION MULTIPLEXING (OFDM) MODULATION," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating data, comprising:
a transmitter for transmitting a communications signal that carries communications data and comprising a modulator for approximating the frequencies of sine/cosine basis waveforms using stored complex exponential functions corresponding to square type waveforms and adding and subtracting the complex exponential functions to generate an orthogonal frequency division multiplexed (OFDM) communications signal as a plurality of N data subcarriers that carry communications data as data symbols; and
a receiver for receiving the OFDM communications signal and comprising a demodulation circuit for demodulating the OFDM communications signal using logical shifts and additions of multiples of $+/-2^p$ based on stored complex exponential functions corresponding to sine/cosine basis waveform approximations to extract amplitude and phase values from a plurality of N data subcarriers as data symbols within the OFDM communications signal.

2. The system according to claim 1, wherein said modulator of said transmitter comprises at least one memory element for storing complex exponential functions of sine/cosine basis waveform approximations.

3. The system according to claim 2, which further comprises a logic circuit for adding and subtracting the complex exponential frequency functions.

4. The system according to claim 3, wherein said logic circuit of the transmitter comprises a shift register circuit for adding and subtracting the complex exponential functions as cosine (nkω/N) and sine (nkω/N).

5. The system according to claim 1, wherein said modulator of said transmitter is operative for modulating N data subcarriers.

6. The system according to claim 1, wherein said modulator of said transmitter is operative for modulating data subcarriers using quadrature amplitude modulation (QAM).

7. The system according to claim 1, wherein said demodulator of said receiver comprises at least one memory element for storing complex exponential functions of sine/cosine basis waveform approximations.

8. The system according to claim 1, said demodulator of said receiver comprises a logic circuit for performing logical shifts and additions in multiples of $+/-2^p$.

9. The system according to claim 8, wherein said logic circuit of said receiver comprises a plurality of mixers that mix an incoming OFDM communications signal with sine/cosine basis approximations.

10. The system according to claim 9, wherein each mixer of the receiver includes a summer connected thereto for summing outputs from the respective mixer.

11. A system for communicating data, comprising:
a transmitter for transmitting a communications signal that carries communications data and comprising
a forward error correction encoder for applying a forward error correction code to communications data as data symbols;
a modulator for approximating the frequencies of sine/cosine basis waveforms using stored complex exponential functions corresponding to square type waveforms and adding and subtracting the complex exponential functions to generate an orthogonal frequency division multiplexed (OFDM) communications signal as a plurality of N data subcarriers that carry communications data and mapped as data symbols into a quadrature amplitude modulation (QAM) scheme; and
a receiver for receiving the OFDM communications signal and comprising
a demodulation circuit for demodulating the OFDM communications signal using logical shifts and additions of multiples of $+/-2^p$ based on stored complex exponential functions corresponding to sine/cosine basis waveform approximations to extract amplitude and phase values from a plurality of N data subcarriers within the OFDM communications signal and demapping the signal as data symbols; and
a circuit for decoding the signal and obtaining the communications data.

12. The system according to claim 11, wherein said modulator of said transmitter comprises at least one memory element for storing complex exponential functions of sine/cosine basis waveform approximations.

13. The system according to claim 12, which further comprises a logic circuit for adding and subtracting the complex exponential frequency functions of sine/cosine basis waveform approximations.

14. The system according to claim 11, wherein said logic circuit comprises a shift register circuit for adding and subtracting the complex exponential functions as cosine (nkω/N) and sine (nkω/N).

15. The system according to claim 11, wherein said modulator is operative for modulating N data subcarriers where N is not restricted to powers of 2.

16. The system according to claim 11, which further wherein said modulator is operative for modulating data subcarriers using quadrature amplitude modulation (QAM).

17. The system according to claim 11, wherein said demodulator of said receiver comprises at least one memory element for storing complex exponential functions of sine/cosine basis waveform approximations.

18. The system according to claim 17, said demodulator of said receiver comprises a logic circuit for performing logical shifts and additions in multiples of $+/-2^n$.

19. The system according to claim 18, wherein said logic circuit comprises a plurality of mixers that mix an incoming OFDM communications signal with sine/cosine basis approximations.

20. The system according to claim 19, wherein each mixer includes a summer connected thereto for summing outputs from the respective mixer.

21. A method for communicating data, which comprises:
distributing communications data over multiple subcarriers that are orthogonal to each other by approximating the frequencies of sine/cosine basis waveforms using stored complex exponential functions corresponding to square type waveforms and adding and subtracting the complex exponential functions to generate an orthogonal frequency division multiplexed (OFDM) communications signal as a plurality of N data subcarriers that carry communications data;
transmitting the OFDM communications signal over a communications channel;
receiving the OFDM communications channel within a receiver; and
demodulating the OFDM communications signal by using logical shifts and additions of multiples of $+/-2^p$ based on stored complex exponential functions corresponding to sine/cosine basis waveform approximations to extract amplitude and phase values from a plurality of N data subcarriers.

22. The method according to claim 21, which further comprises storing complex exponential functions of sine/cosine basis waveform approximations within at least one memory element for both modulating and demodulating the signal.

23. The method according to claim 22, which further comprises adding and subtracting the complex exponential functions as cosine (nkω/N) and sine (nkω/N) for both modulating and demodulating the signal.

24. The method according to claim 21, which further comprises modulating N data subcarriers where N is not restricted to powers of 2.

* * * * *